United States Patent
Ono

(10) Patent No.: US 10,602,066 B2
(45) Date of Patent: Mar. 24, 2020

(54) IMAGING DEVICE, IMAGING METHOD, PROGRAM, AND NON-TRANSITORY RECORDING MEDIUM

(71) Applicant: FUJIFILM Corporation, Tokyo (JP)

(72) Inventor: Shuji Ono, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 1 day.

(21) Appl. No.: 16/188,308

(22) Filed: Nov. 13, 2018

(65) Prior Publication Data
US 2019/0082109 A1   Mar. 14, 2019

Related U.S. Application Data

(63) Continuation of application No. PCT/JP2017/010052, filed on Mar. 14, 2017.

(30) Foreign Application Priority Data

May 17, 2016 (JP) .................. 2016-098914

(51) Int. Cl.
| | | |
|---|---|---|
| *H04N 5/232* | (2006.01) | |
| *H04N 5/225* | (2006.01) | |
| *G06T 5/00* | (2006.01) | |
| *G03B 17/17* | (2006.01) | |

(Continued)

(52) U.S. Cl.
CPC ......... *H04N 5/23254* (2013.01); *G03B 17/17* (2013.01); *G03B 19/22* (2013.01);
(Continued)

(58) Field of Classification Search
CPC .......... H04N 5/23229; H04N 5/23238; H04N 5/23254; H04N 5/23267; G06T 5/003
See application file for complete search history.

(56) References Cited

U.S. PATENT DOCUMENTS

| | | | |
|---|---|---|---|
| 5,157,732 A | 10/1992 | Ishii et al. | |
| 9,470,875 B2 * | 10/2016 | Ono | ............. H04N 5/2259 |

(Continued)

FOREIGN PATENT DOCUMENTS

| | | |
|---|---|---|
| JP | H02246686 | 10/1990 |
| WO | 2013024636 | 2/2013 |
| WO | 2013146506 | 10/2013 |

OTHER PUBLICATIONS

"International Search Report (Form PCT/ISA/210) of PCT/JP2017/010052," dated Apr. 11, 2017, with English translation thereof, pp. 1-4.

(Continued)

*Primary Examiner* — Daniel M Pasiewicz
(74) *Attorney, Agent, or Firm* — JCIPRNET

(57) ABSTRACT

Provided are an imaging device, an imaging method, a program, and a non-transitory recording medium which simultaneously image a plurality of images having different imaging characteristics, and detect blurring of the plurality of images. Image signals having imaging characteristics different from each other are simultaneously obtained by an imaging unit including an imaging optical system constituted by a first optical system and a second optical system which are provided in different regions and have imaging characteristics different from each other and a directional sensor, true movement vectors are extracted from movement vectors detected from the image signals and degrees of certainty thereof, and blurring of an image resulting from a shake of the imaging unit is detected from the true movement vectors.

20 Claims, 20 Drawing Sheets

(51) Int. Cl.
*G03B 19/22* (2006.01)
*G06T 7/246* (2017.01)
*G06T 5/50* (2006.01)
*G06T 7/00* (2017.01)

(52) U.S. Cl.
CPC ............... *G06T 5/003* (2013.01); *G06T 5/50* (2013.01); *G06T 7/0002* (2013.01); *G06T 7/248* (2017.01); *H04N 5/2254* (2013.01); *H04N 5/23229* (2013.01); *H04N 5/23238* (2013.01); *H04N 5/23267* (2013.01); *G03B 2217/005* (2013.01); *G06T 2207/20201* (2013.01); *G06T 2207/30168* (2013.01)

(56) References Cited

U.S. PATENT DOCUMENTS

| | | | |
|---|---|---|---|
| 10,393,993 B2 * | 8/2019 | Ono | G02B 7/021 |
| 2004/0042780 A1 * | 3/2004 | Kindaichi | G02B 7/38 |
| | | | 396/112 |
| 2009/0135502 A1 * | 5/2009 | Border | G02B 17/0896 |
| | | | 359/721 |
| 2014/0152779 A1 | 6/2014 | Ono | |
| 2015/0009369 A1 | 1/2015 | Ono | |
| 2015/0338606 A1 * | 11/2015 | Ono | H04N 5/2259 |
| | | | 348/322 |
| 2016/0323504 A1 * | 11/2016 | Ono | H04N 5/2259 |
| 2017/0099436 A1 * | 4/2017 | Ono | G02B 17/08 |
| 2017/0104929 A1 * | 4/2017 | Ono | G02B 13/00 |
| 2017/0280045 A1 * | 9/2017 | Nonaka | H04N 5/225 |

OTHER PUBLICATIONS

"Written Opinion of the International Searching Authority (Form PCT/ISA/237) of PCT/JP2017/010052," dated Apr. 11, 2017, with English translation thereof, pp. 1-7.

* cited by examiner

IMAGING DEVICE, IMAGING METHOD, PROGRAM, AND NON-TRANSITORY RECORDING MEDIUM

CROSS-REFERENCE TO RELATED APPLICATIONS

This application is a Continuation of PCT International Application No. PCT/JP2017/010052 filed on Mar. 14, 2017, which claims priority under 35 U.S.C § 119(a) to Patent Application No. 2016-098914 filed in Japan on May 17, 2016, all of which are hereby expressly incorporated by reference into the present application.

BACKGROUND OF THE INVENTION

1. Field of the Invention

The present invention relates to an imaging device, an imaging method, a program, and a non-transitory recording medium, and particularly, to a technology that simultaneously images a plurality of images by using a directional sensor in which light receiving sensors have directivity with respect to incidence angles of light rays.

2. Description of the Related Art

An imaging system capable of simultaneously obtaining a plurality of images having different imaging characteristics by using an imaging system comprising an optical system having imaging characteristics different depending on regions and a directional sensor has been suggested. The directional sensor is ideally manufactured so as to sense only light rays from an assumed pupil region. However, interference is caused in reality, and thus, the directional sensor may sense light rays even from another pupil region since.

With respect to such a problem, WO2013/146506A describes a technology that generates an image corresponding to one region of a plurality of regions from imaging signals of light receiving sensors corresponding to the one region, and removes the influence of luminous flux passed through regions other than the one region from the image generated so as to correspond to the one region at the time of correcting the generated image.

SUMMARY OF THE INVENTION

An electronic camera shake correction technology that reduces blurring of a displayed image by detecting a shake amount of a device and moving an image reading-out range depending on the shake amount has been known. In the electronic camera shake correction technology, the shake amount is detected by extracting feature points from the image and detecting movement information (movement vector).

In a case where such an electronic camera shake correction technology is applied to an imaging system comprising an optical system having different imaging characteristics depending on regions and a directional sensor, there is a concern that movement of a false image resulting from an interference will be erroneously recognized as movement of a true image.

A technology described in WO2013/146506 does not completely remove the interference. Accordingly, it is difficult to correctly ascertain the movement of a subject in response to the interference.

The present invention has been made in view of such circumstances, and an object of the present invention is to provide an imaging device, an imaging method, a program, and a non-transitory recording medium which simultaneously image a plurality of images having different imaging characteristics and detect blurring of the plurality of images.

In order to achieve the aforementioned object, an aspect of an imaging device is an imaging device which comprises an imaging unit that includes an imaging optical system constituted by a first optical system and a second optical system which are provided in different regions and have imaging characteristics different from each other, and a directional sensor which comprises a plurality of pixels constituted by photoelectric conversion elements arranged in a two-dimensional shape and selectively receives divided luminous flux obtained by dividing luminous flux incident through the first optical system and the second optical system through pupil division by using the plurality of pixels, an image reading-out unit that obtains image signals of a first image obtained through the first optical system and image signals of a second image obtained through the second optical system from the directional sensor, a movement vector detection unit that detects first movement vectors which are movement vectors of a subject on the first image and second movement vectors which are movement vectors of the subject on the second image, a certainty degree calculation unit that calculates first degrees of certainty which are degrees of certainty indicating that the first movement vectors are movement vectors resulting from luminous flux passed through the first optical system and second degrees of certainty which are degrees of certainty indicating that second movement vectors are movement vectors resulting from luminous flux passed through the second optical system, a movement vector extraction unit that extracts first true movement vectors which are movement vectors resulting from the luminous flux passed through the first optical system on the first image and second true movement vectors which are movement vectors resulting from the luminous flux passed through the second optical system on the second image based on the first movement vectors, the second movement vectors, the first degrees of certainty, and the second degrees of certainty, and a blurring detection unit that detects first blurring of the first image resulting from a shake of the imaging unit based on the first true movement vectors and second blurring of the second image resulting from the shake of the imaging unit based on the second true movement vectors.

According to the present aspect, since the image signals having imaging characteristics different from each other are simultaneously obtained by the imaging unit including the imaging optical system having imaging characteristics different from each other and the directional sensor, the true movement vectors are extracted from the movement vectors detected from the image signals and the degrees of certainty thereof, and the blurring of the image resulting from the shake of the imaging unit is detected from the true movement vectors, it is possible to simultaneously image the plurality of images having different imaging characteristics, and it is possible to detect the blurring of the plurality of images.

It is preferable that the imaging device further comprises an electronic shake correction unit that displays the first image obtained by moving a position of a cutout region of the first image and cutting out the first image in the position based on the first blurring on a display unit, and displays the second image obtained by moving a position of a cutout region of the second image and cutting out the second image in the position based on the second blurring on the display unit. Accordingly, it is possible to reduce the blurring of the image to be displayed on the display unit.

One of the first optical system and the second optical system may be a wide angle optical system, and the other one may be a telephoto optical system which has an optical axis common to the wide angle optical system and has a focal length longer than a focal length of the wide angle optical system. Accordingly, it is possible to simultaneously image the wide angle image and the telephoto image, and it is possible to detect the first blurring and the second blurring.

The blurring detection unit may detect the first blurring and the second blurring based on a ratio between the focal lengths of the first optical system and the second optical system. Accordingly, it is possible to appropriately detect the first blurring and the second blurring.

The movement vector detection unit may detect first feature points of the subject from a plurality of the first images continuously obtained, and may detect a plurality of the first movement vectors having magnitudes different from each other based on the detected first feature points. The movement vector detection unit may detect second feature points of the subject from a plurality of the second images continuously obtained, and may detect a plurality of the second movement vectors having magnitudes different from each other based on the detected second feature points. Accordingly, it is possible to appropriately detect the first movement vectors and the second movement vectors.

It is preferable that the certainty degree calculation unit calculates the first degrees of certainty for the plurality of first movement vectors and calculates the second degrees of certainty for the plurality of second movement vectors. Accordingly, it is possible to appropriately calculate the first degrees of certainty and the second degrees of certainty.

It is preferable that the certainty degree calculation unit calculates the first degrees of certainty for the plurality of first movement vectors and calculates the second degrees of certainty for the plurality of second movement vectors, based on brightness signals in the first feature points and brightness signals in feature points of the second feature points corresponding to the first feature points. Accordingly, it is possible to appropriately calculate the first degrees of certainty and the second degrees of certainty.

It is preferable that in a case where the first degree of certainty for one movement vector of the plurality of first movement vectors is greater than the second degree of certainty for the second movement vector corresponding to the one movement vector, the movement vector extraction unit determines that the second movement vector corresponding to the one movement vector is a movement vector resulting from an interference to the second optical system from the first optical system, and extracts the one movement vector as the first true movement vector and in a case where the first degree of certainty for the one movement vector is equal to less than the second degree of certainty for the second movement vector corresponding to the one movement vector, the movement vector extraction unit determines that the one movement vector is a movement vector resulting from an interference to the first optical system from the second optical system, and extracts the second movement vector as the second true movement vector. Accordingly, it is possible to appropriately extract the first true movement vectors and the second true movement vectors.

It is preferable that the imaging optical system is an imaging optical system configured such that the first optical system is disposed in a central part and the second optical system is disposed at an edge part of the first optical system in a ring shape. Accordingly, it is possible to appropriately image the plurality of images having different imaging characteristics.

In order to achieve the aforementioned object, an aspect of an imaging method is an imaging method of an imaging device comprising an imaging unit that includes an imaging optical system constituted by a first optical system and a second optical system which are provided in different regions and have imaging characteristics different from each other, and a directional sensor which comprises a plurality of pixels constituted by photoelectric conversion elements arranged in a two-dimensional shape and selectively receives divided luminous flux obtained by dividing luminous flux incident through the first optical system and the second optical system through pupil division by using the plurality of pixels. The method comprises an image reading-out step of obtaining image signals of a first image obtained through the first optical system and image signals of a second image obtained through the second optical system from the directional sensor, a movement vector detecting step of detecting first movement vectors which are movement vectors of a subject on the first image and second movement vectors which are movement vectors of the subject on the second image, a certainty degree calculating step of calculating first degrees of certainty which are degrees of certainty indicating that the first movement vectors are movement vectors resulting from luminous flux passed through the first optical system and second degrees of certainty which are degrees of certainty indicating that the second movement vectors are movement vectors resulting from luminous flux passed through the second optical system, a movement vector extracting step of extracting first true movement vectors which are movement vectors resulting from the luminous flux passed through the first optical system on the first image and second true movement vectors which are movement vectors resulting from the luminous flux passed through the second optical system on the second image based on the first movement vectors, the second movement vectors, the first degrees of certainty, and the second degrees of certainty, and a blurring detecting step of detecting first blurring of the first image resulting from a shake of the imaging unit based on the first true movement vectors, and detecting second blurring of the second image resulting from the shake of the imaging unit based on the second true movement vectors.

According to the present aspect, since the image signals having imaging characteristics different from each other are simultaneously obtained by the imaging unit including the imaging optical system having imaging characteristics different from each other and the directional sensor, the true movement vectors are extracted from the movement vectors detected from the image signals and the degrees of certainty thereof, and the blurring of the image resulting from the shake of the imaging unit is detected from the true movement vectors, it is possible to simultaneously image the plurality of images having different imaging characteristics, and it is possible to detect the blurring of the plurality of images.

It is preferable that the imaging method further comprises an electronic shake correcting step of displaying the first image obtained by moving a position of a cutout region of the first image and cutting out the first image in the position based on the first blurring on a display unit, and displaying the second image obtained by moving a position of a cutout region of the second image and cutting out the second image in the position based on the second blurring on the display unit. Accordingly, it is possible to reduce the blurring of the image to be displayed on the display unit.

A program causing the imaging device to perform the imaging method is also included in the present aspect. A non-transitory recording medium having computer-readable codes of the program recorded thereon is also included in the present aspect.

According to the present invention, it is possible to simultaneously image the plurality of images having different imaging characteristics, and it is possible to detect the blurring of the plurality of images.

DESCRIPTION OF THE PREFERRED EMBODIMENTS

Hereinafter, preferred embodiments of the present invention will be described in detail with reference to the accompanying drawings.

Configuration of Digital Camera

Figure 1:
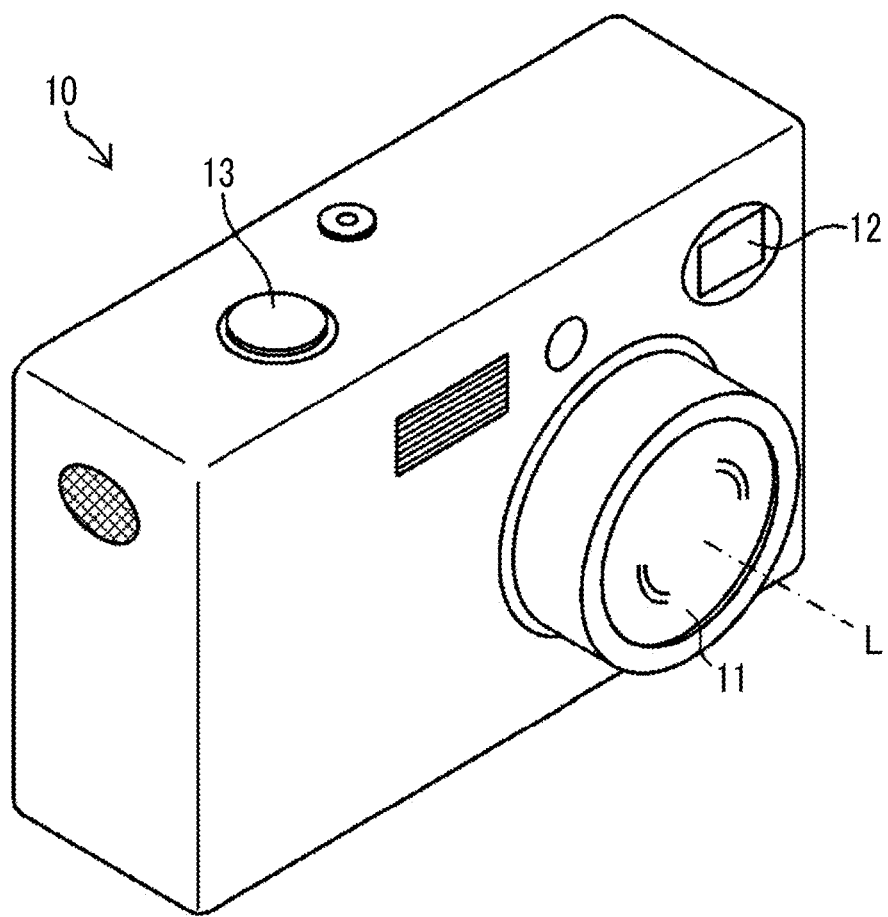
FIG. 1 is a perspective view showing a digital camera.

FIG. 1 is a perspective view showing a digital camera 10 (an example of an imaging device) according to the present embodiment. The digital camera 10 is configured such that an imaging optical system 11 having an optical axis L and a flash light emitting unit 12 that irradiates a subject with imaging auxiliary light rays are provided on a front surface of a main body and a release button 13 for performing an imaging operation are provided on an upper surface of the main body.

The digital camera 10 may image a motion picture of a subject. In a case where a photographer directs the imaging optical system 11 toward the subject while holding the digital camera 10, a subject image is formed on a light receiving surface of an imaging element 24 (see FIG. 2) through the imaging optical system 11. The subject image is photoelectrically converted by the imaging element 24, and is read out as image signals for a predetermined period. Image processing is performed on the image signals obtained for the predetermined period, and thus, the motion picture of the subject can be obtained.

At the time of imaging the motion picture, the hands of the photographer who holds the digital camera 10 is shaken (camera shake occurs), and thus, image blurring is caused in the captured motion picture in some cases. In this example, a process for correcting (reducing) the image blurring caused by the camera shake, among image blurring caused in the motion picture, is referred to as "camera shake correction". Particularly, a process for correcting the image blurring by moving a position of a cutout region of the image is referred to as "electronic camera shake correction". The camera shake is not limited to be caused by the shake of the hands of the photographer, and includes shakes caused by the shake of a main body of the digital camera 10 due to any cause.

Configuration of Imaging Unit

Figure 2:
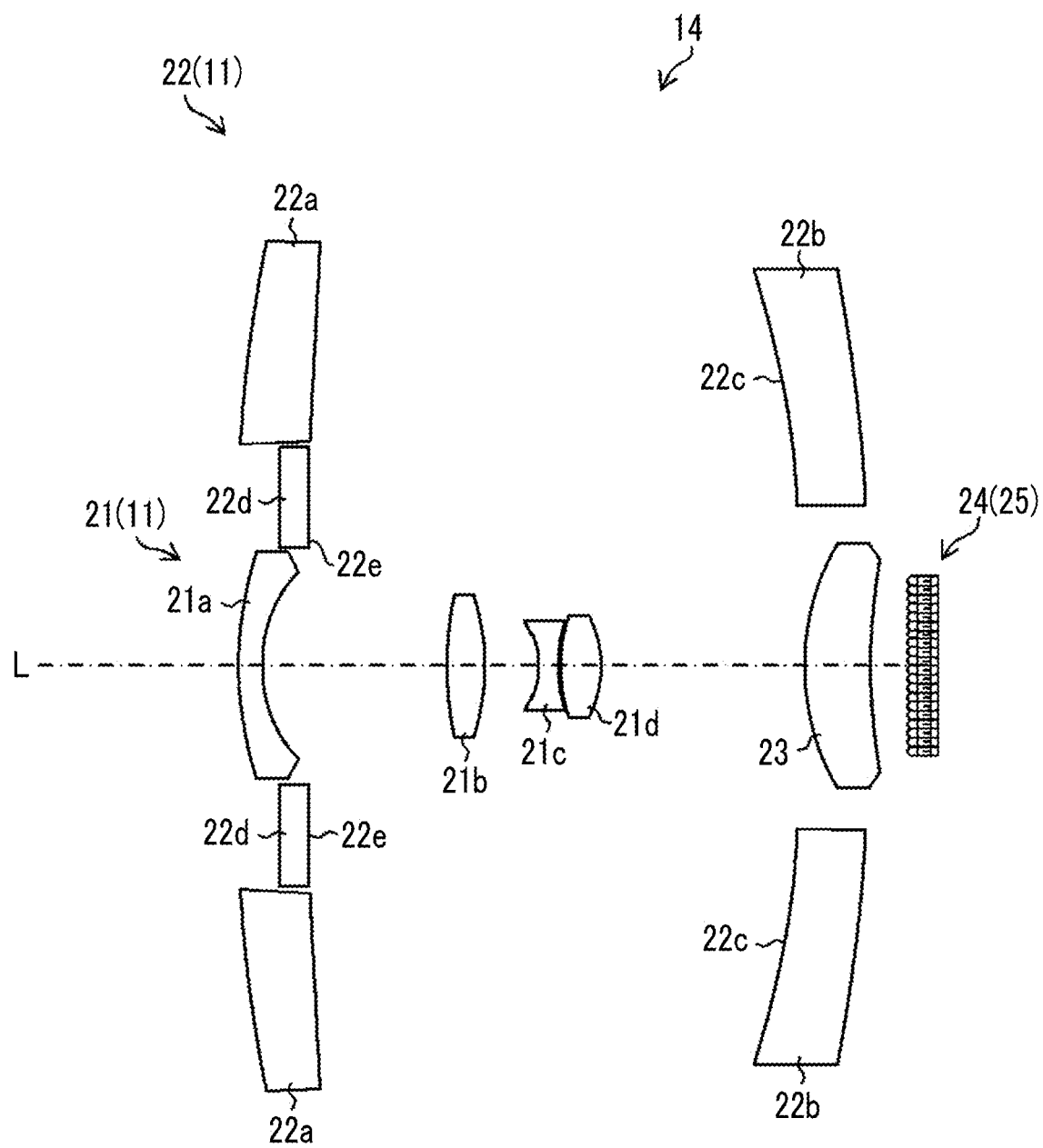
FIG. 2 is a diagram showing a cross-sectional configuration of an imaging unit.

FIG. 2 is a diagram showing a cross-sectional configuration of an imaging unit 14 comprising the imaging optical system 11 and the imaging element 24.

The imaging optical system 11 includes a first optical system 21 and a second optical system 22 having characteristics independent of each other, and particularly, the first optical system 21 and the second optical system 22 are constituted by different optical systems of which focal lengths are different in the present embodiment. That is, the imaging optical system 11 according to the present embodiment includes the first optical system 21 (an example of a wide angle optical system which is one thereof) composed of a wide angle image imaging lens group and the second optical system 22 (an example of a telephoto optical system which is the other one thereof) composed of a telephoto image imaging lens group, and may simultaneously image a wide angle image and a telephoto image by using the imaging element 24.

The first optical system 21 shown in FIG. 2 includes a first wide angle lens 21a, a second wide angle lens 21b, a third wide angle lens 21c, a fourth wide angle lens 21d, and a common lens 23 which are arranged on the same optical axis L. Meanwhile, the second optical system 22 includes a first telephoto lens 22a, a first telephoto reflector 22b provided with a first telephoto reflection mirror 22c, a second telephoto reflector 22d provided with a second telephoto reflection mirror 22e, and the common lens 23.

The first optical system 21 (particularly, the first wide angle lens 21a, the second wide angle lens 21b, the third wide angle lens 21c, and the fourth wide angle lens 21d) and the second optical system 22 (particularly, the first telephoto lens 22a, the first telephoto reflector 22b, the first telephoto reflection mirror 22c, the second telephoto reflector 22d, and the second telephoto reflection mirror 22e) are concentrically arranged. The first optical system 21 forms a central optical system, and the second optical system 22 forms a peripheral optical system disposed at an edge part of the first optical system 21 in a ring shape. The common lens 23 is disposed on the optical axis L, and is commonly used between the first optical system 21 and the second optical system 22.

As stated above, the imaging optical system 11 includes the first optical system 21 and the second optical system 22 which have the common optical axis L, and the first optical system 21 and the second optical system 22 have focal lengths and imaging angles of view are different from each other.

The imaging element 24 is a directional sensor configured such that a plurality of light receiving sensors 25 (photoelectric conversion elements) has directivity with respect to incidence angles of light rays. Pixels constituted by the plurality of light receiving sensors 25 are arranged in a two-dimensional shape in a direction perpendicular to the optical axis L. The imaging element simultaneously receives wide angle image light rays W (see FIG. 4, an example of luminous flux passed through the first optical system) incident through the first optical system 21 and telephoto image light rays T (see FIG. 5, an example of luminous flux passed through the first optical system) incident through the second optical system 22.

Figure 3:
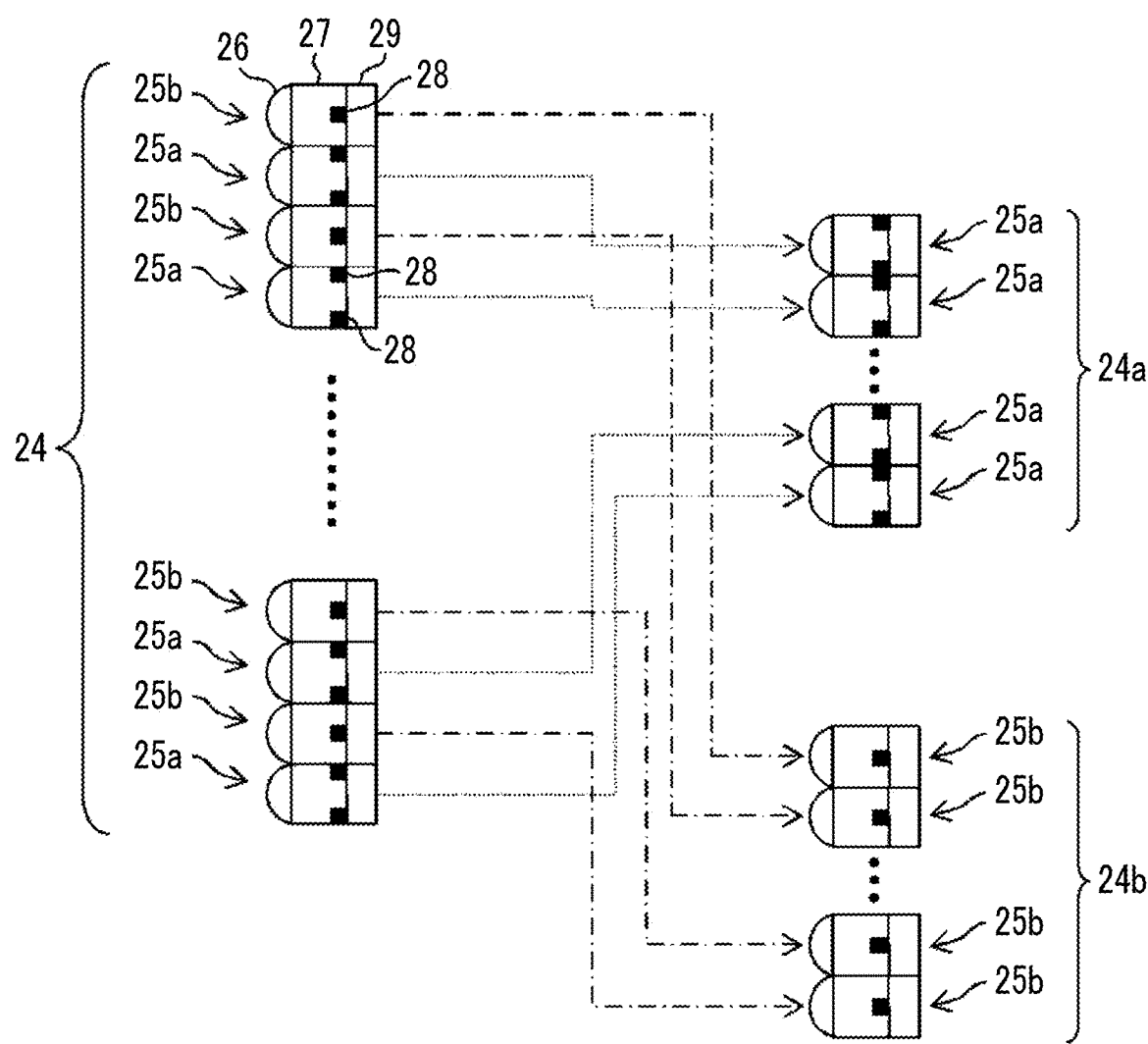
FIG. 3 is a diagram showing a detailed cross-sectional configuration example of an imaging element.

FIG. 3 is a diagram showing a detailed cross-sectional configuration example of the imaging element 24. The imaging element 24 comprises first light receiving sensors 25a and second light receiving sensors 25b of which angle sensitivity characteristics are different, and the first light receiving sensors 25a and the second light receiving sensors 25b are alternately arranged.

The first light receiving sensors 25a receive the wide angle image light rays W, and output first image signals for generating a wide angle image. The second light receiving sensors 25b receive the telephoto image light rays T, and output second image signals for generating a telephoto image (an example of a second image).

The plurality of first light receiving sensors 25a composes a first sensor group 24a that selectively receives the wide angle image light rays W, and the plurality of second light receiving sensors 25b composes a second sensor group 24b that selectively receives the telephoto image light rays T.

Each of the first light receiving sensor 25a and the second light receiving sensor 25b has a microlens 26, a photodiode 29, and an interlayer 27 on which the microlens 26 and the photodiode 29 are arranged. A light shielding mask 28 is provided on the interlayer 27. The light shielding mask 28 is disposed at an edge part of a light receiving surface of the photodiode 29 in the first light receiving sensor 25a, and the light shielding mask 28 is disposed at a central part of the light receiving surface of the photodiode 29 in the second light receiving sensor 25b. The arrangement of the light shielding masks 28 is determined depending on whether the light shielding mask is disposed at the first optical system 21 or the second optical system 22, and each light shielding mask 28 shields the light from the non-corresponding optical system and enables the photodiode 29 to receive the light from the corresponding optical system without shielding the light from the corresponding optical system.

Although the plurality of light receiving sensors that divides the light rays passed through the corresponding optical system of the first optical system 21 and the second optical system 22 through pupil division, and selectively receives the divided light rays by using the light receiving sensors 25 including the light shielding masks 28 is realized in the present embodiment, the pupil division may be realized by another means. For example, the light shielding mask 28 may be provided in front of the microlens 26 (between the microlens 26 and the common lens 23 (for example, see FIG. 3)), and light shielding means (for example, the liquid crystal shutter) other than the light shielding mask 28 may be used.

A member other than the light shielding mask 28 may be provided on the interlayer 27, and a wiring and/or a circuit may be provided on the interlayer 27.

A color filter array constituted by R (red), G (green), and B (blue) color filters (optical filters) provided so as to correspond to the light receiving sensors 25 is provided in the imaging element 24, and an image generating unit 32 (see FIG. 6) performs a demosaicing process on colors images (mosaic images) obtained so as to correspond to a color array pattern of the color filter array. Accordingly, a color wide angle image and a color telephoto image are obtained.

Figure 4:
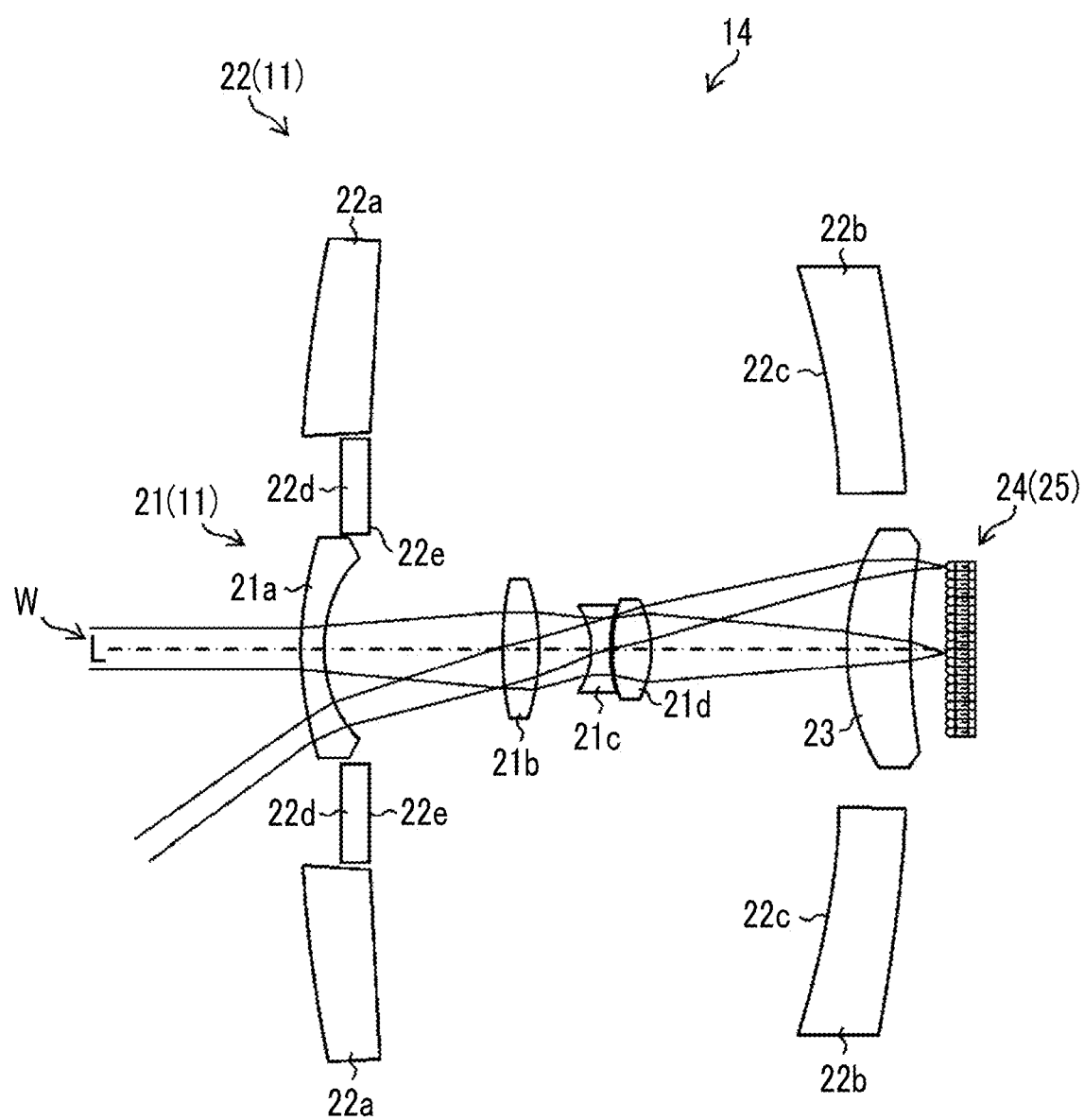
FIG. 4 is a diagram showing an optical path of wide angle image light rays incident on the imaging unit.

FIG. 4 is a diagram showing an optical path of the wide angle image light rays W incident on the imaging optical system 11 (particularly, the first optical system 21) and the imaging element 24 (particularly, the first sensor group 24a (see FIG. 3)) shown in FIG. 2. In the present embodiment, the wide angle image light rays W pass through the first wide angle lens 21a, the second wide angle lens 21b, the third wide angle lens 21c, the fourth wide angle lens 21d, and the common lens 23 of the first optical system 21 in order, and the wide angle image is formed on the imaging element 24.

Figure 5:
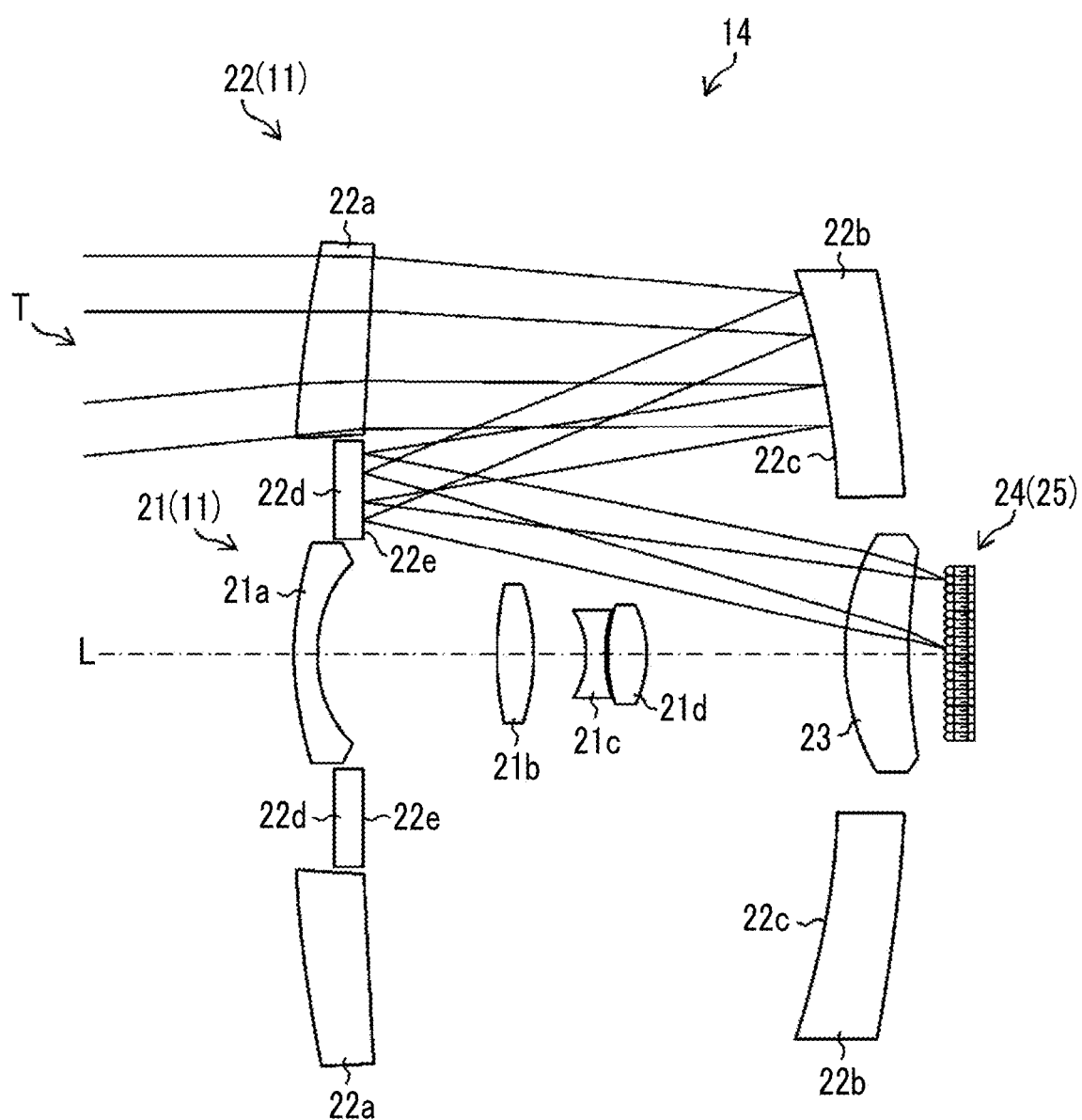
FIG. 5 is a diagram showing an optical path of telephoto image light rays incident on the imaging unit.

FIG. 5 is a diagram showing of an optical path of the telephoto image light rays T incident on the imaging optical system 11 (particularly, the second optical system 22) and the imaging element 24 (particularly, the second sensor group 24b (see FIG. 3)) shown in FIG. 2. In the present embodiment, the telephoto image light rays T pass (transmits) through the first telephoto lens 22a, are reflected by the first telephoto reflection mirror 22c and the second telephoto reflection mirror 22e, and pass through the common lens 23. Thus, the telephoto image is formed on the imaging element 24. As state above, the telephoto image light rays are reflected by the first telephoto reflection mirror 22c and the second telephoto reflection mirror 22e, and thus, the optical path thereof is turned. Accordingly, it is possible to decrease a length regarding a direction of the optical axis L of the second optical system 22 for imaging the telephoto image having a long focal length.

Figure 6:
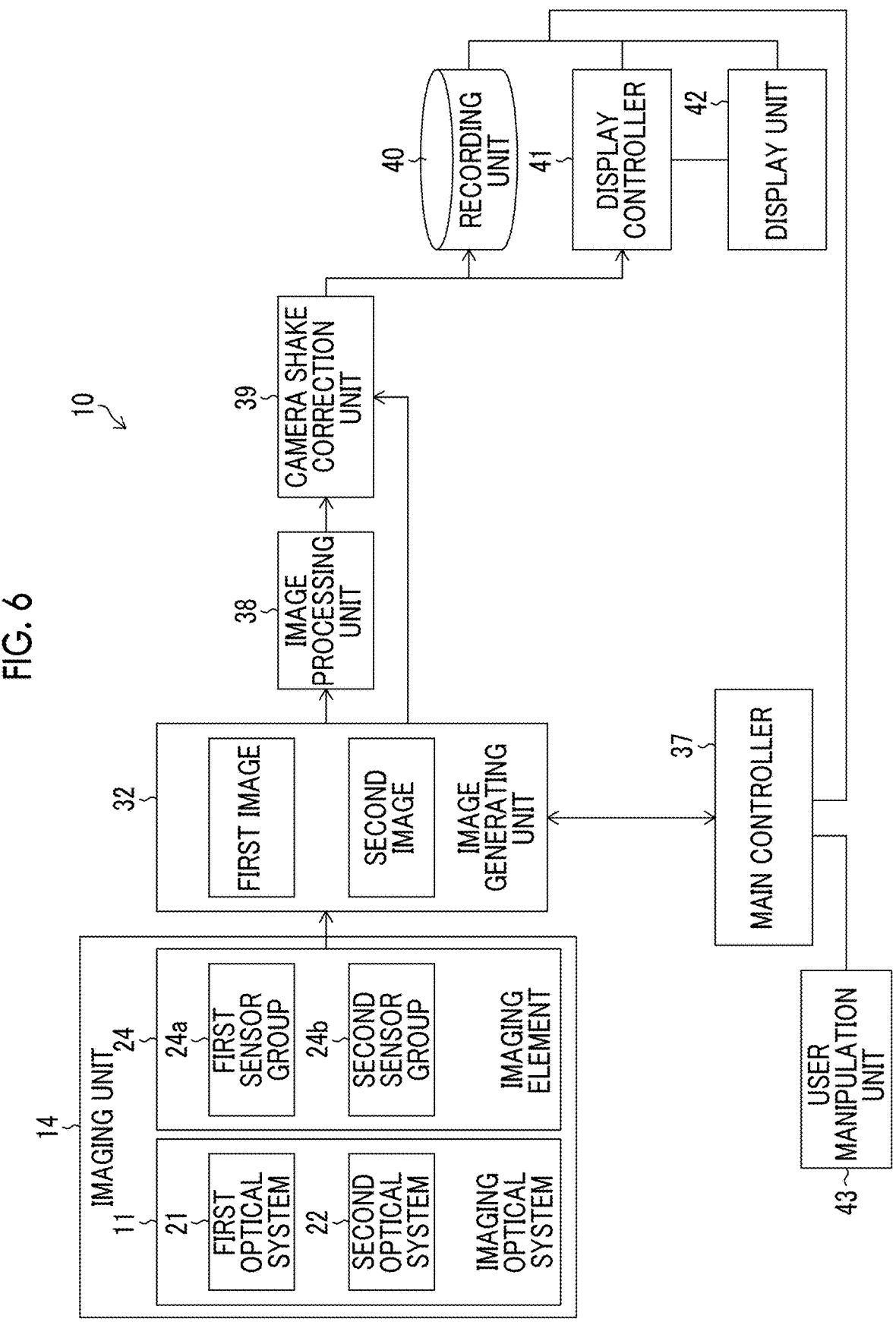
FIG. 6 is a block diagram showing a functional configuration example of the digital camera.

FIG. 6 is a block diagram showing a functional configuration example of the digital camera 10. The digital camera 10 includes the image generating unit 32, a main controller 37, an image processing unit 38, a camera shake correction unit 39, a recording unit 40, a display controller 41, a display unit 42, and a user manipulation unit 43, in addition to the imaging optical system 11 (the first optical system 21 and the second optical system 22) and the imaging element 24 (the first sensor group 24*a* and the second sensor group 24*b*).

The image generating unit 32 (an example of an image reading-out unit) generates first image data of the wide angle image based on the first image signals output from the first sensor group 24*a*, and generates second image data of the telephoto image based on the second image signals output from the second sensor group 24*b*. The first image data and the second image data generated by the image generating unit 32 are input to the image processing unit 38 and the camera shake correction unit 39.

The image processing unit 38 (an example of a movement vector detection unit, an example of a certainty degree calculation unit, or an example of a movement vector extraction unit) detects a subject on the first image data and the second image data. The image processing unit detects movement vectors of the subject, calculates degrees of certainty, and extracts true movement vectors based on the detection result. Processes using the image processing unit 38 will be described in detail.

The camera shake correction unit 39 (an example of a blurring detection unit or an example of an electronic shake correction unit) detects the shake of the imaging unit 14, that is, the shake of the digital camera 10 based on the true movement vectors extracted by the image processing unit 38, and cuts out the first image data and the second image data such that blurring does not occur in the subject image to be displayed on the display unit 42. The cutout first image data and second image data are input to the recording unit 40, the display controller 41, and/or the main controller 37 to be provided behind the camera shake correction unit.

The recording unit 40 (an example of a recording unit) records the cutout first image data and second image data. The recording unit may record the first image data, the second image data, the movement vectors, the degrees of certainty, and the true movement vectors in association with each other.

The display controller 41 (an example of a display unit) displays the wide angle image and the telephoto image on the display unit 42 based on the cut first image data and second image data.

The main controller 37 is constituted by a circuit including a central processing unit (CPU), and controls processing functions in the respective units while being connected to other units constituting the imaging unit 14, the image generating unit 32, the image processing unit 38, the camera shake correction unit 39, the recording unit 40, the display controller 41, the display unit 42, the user manipulation unit 43, the digital camera 10. Each unit may be constituted by a general-purpose CPU, or may be constituted by a programmable logic device (PLD) which is a processor capable of changing a circuit configuration after a field-programmable gate array (FPGA) is manufactured, a dedicated electric circuit which is a processor having a circuit configuration designed as a dedicated circuit for performing a specific process such as an Application-Specific Integrated Circuit (ASIC), or combinations thereof. The user manipulation unit 43 is manipulated by the user, and thus, various instruction commands are input thereto. The various instruction commands input to the user manipulation unit 43 are transmitted to the main controller 37, and the main controller 37 controls the respective units of the digital camera 10 based on the instruction commands.

Wide Angle Image and Telephoto Image

Figure 7:
FIG. 7 is a diagram showing an example of a wide angle image.
Figure 8:
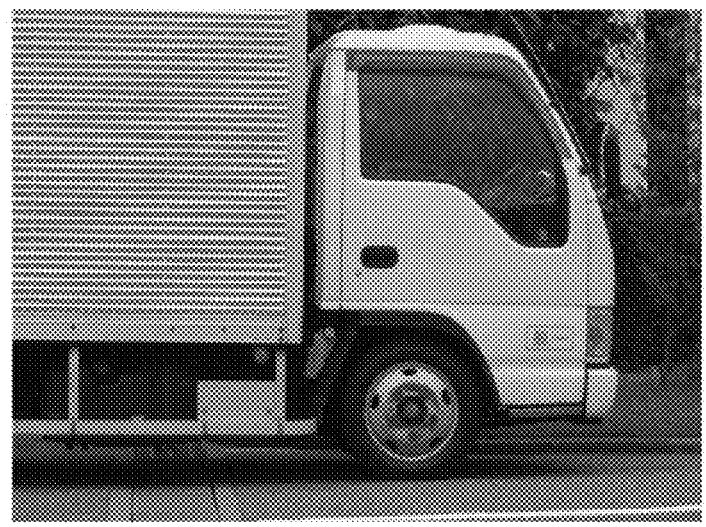
FIG. 8 is a diagram showing an example of a telephoto image.

FIGS. 7 and 8 show diagrams showing examples of the wide angle image and the telephoto image simultaneously captured, and show a case where the wide angle image and the telephoto image do not interfere with each other (a case where the wide angle image light rays W are not completely incident on the second light receiving sensors 25*b* and the telephoto image light rays T are not completely incident on the first light receiving sensors 25*a*).

Figure 9:
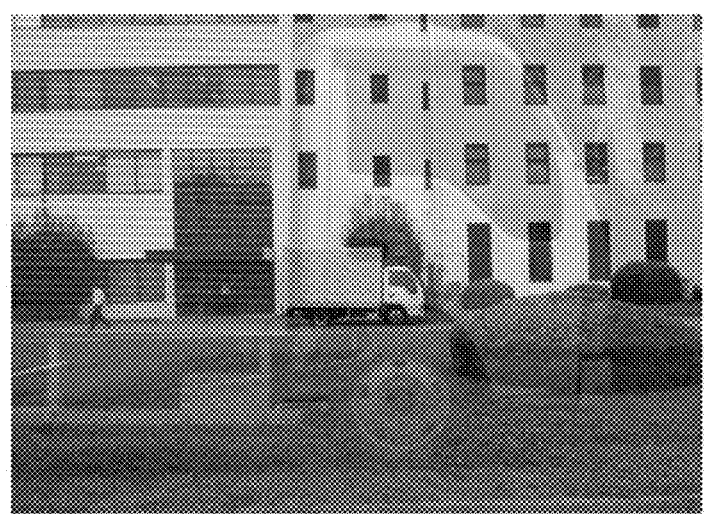
FIG. 9 is a diagram showing an example of a wide angle image in which interference is caused.
Figure 10:
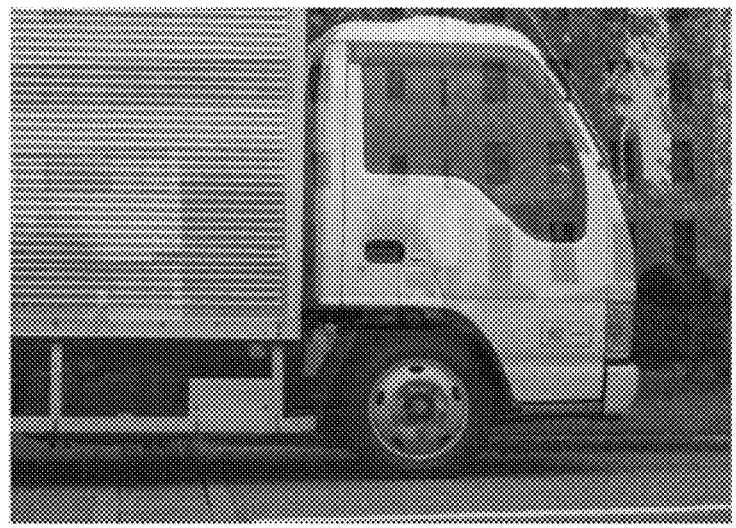
FIG. 10 is a diagram showing an example of a telephoto image in which interference is caused.

In contrast, FIGS. 9 and 10 are respectively diagrams showing examples of the wide angle image and the telephoto image in a case where the wide angle image and the telephoto image interfere with each other. As shown in FIG. 9, the telephoto image interferes with the wide angle image, and a false image (a large image of a freight vehicle) resulting from the interference dimly appears on the image in addition to the original subject image (a small freight vehicle in the center of the image). Meanwhile, as shown in FIG. 10, the wide angle image interferes with the telephoto image, and a false image (a small image of the freight vehicle) resulting from the interference dimly appears in the center of the image in addition to the original subject (a large freight vehicle in the middle of the image). The extraction of the true movement vectors to be described below will be described with such a situation as an example.

Extraction of True Movement Vectors based on Degrees of Certainty (First Example)

Initially, the extraction of the true movement vectors based on degrees of certainty will be conceptually described. In this example, it is assumed that a freight vehicle is stopping with consideration for a case where only the freight vehicle in FIGS. 7 to 10 is used as the subject in order to simplify the description.

Figure 11:
FIG. 11 is a diagram showing a subject and movement vectors on the wide angle image.

FIG. 11 is a diagram showing the wide angle image, and shows an outline of a subject and first movement vectors (arrows in this diagram) detected for feature points present in the outline. In this diagram, a subject image resulting from the interference of the telephoto image is not shown. A start point of each movement vector is represented as a feature point, and a degree of certainty of the movement vector is represented by a thickness of the movement vector.

In this example, the degree of certainty of the movement vector is an index of reliability indicating that the detected movement vector is a true subject in the optical system. The higher the reliability, the larger the degree of certainty. FIG. 11 shows a case where the higher the reliability, the thicker the thickness of the vector. The degree of certainty may reflect the intensity of brightness signals as the basis of the detection of the movement vector, and may be quantified by using brightness differences between the feature points at which the movement vectors are detected. The degree of certainty may be quantified based on the magnitude of a color difference and/or the density of adjacent feature points.

Figure 12:
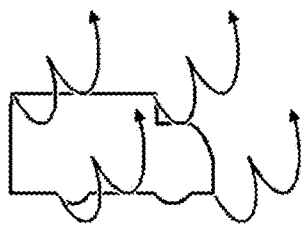
FIG. 12 is a diagram showing a subject image of the wide angle image interfering with the telephoto image.

FIG. 12 is a diagram showing the telephoto image, and is a diagram showing a subject of the wide angle image resulting from the interference. Similarly to FIG. 11, FIG. 12 shows a case where an outline of the subject and second movement vectors (arrows in this diagram) detected based on feature points present in the outline. In this diagram, a true subject of the telephoto image is not shown. A subject image in this diagram is an image resulting from the interference. Since the subject image shown in FIG. 12 has brightness less than that of the subject image shown in FIG. 11, the subject image shown in FIG. 12 has a degree of certainty less than that of the subject image shown in FIG. 11. Accordingly, the movement vectors are represented so as to be thinner than those shown in FIG. 11.

In the present embodiment, since the first optical system 21 and the second optical system 22 have the common optical axis L, a position of a false image resulting from the interference in FIG. 12 is the same as the position of the subject image in FIG. 11. Thus, the wide angle image of FIG. 11 and the telephoto image of FIG. 12 are compared, and it is determined that the movement vectors having lower degrees of certainty are false movement vectors resulting from the interference in a case where there are the movement vectors having the same orientation and the same magnitude in the same position between these images. In this manner, the extraction result of only the true movement vectors is shown in FIGS. 13 and 14.

Figure 13:
FIG. 13 is a diagram showing true movement vectors extracted from the wide angle image.
Figure 14:
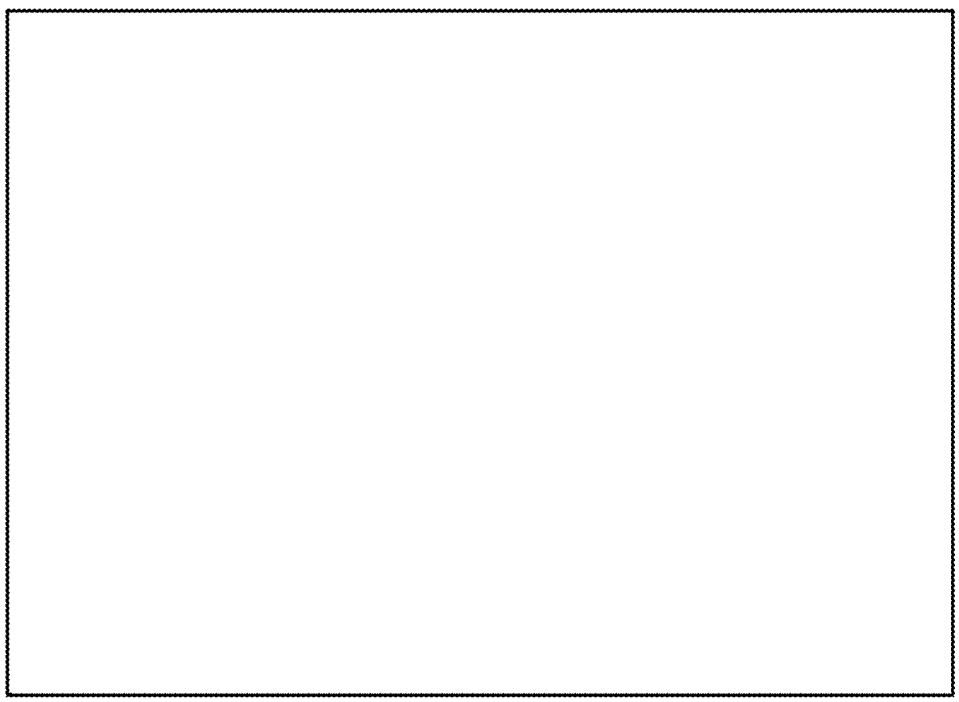
FIG. 14 is a diagram showing true movement vectors extracted from the telephoto image.

FIG. 13 is a diagram showing the true movement vectors extracted from the wide angle image shown in FIG. 11, and FIG. 14 is a diagram showing the true movement vectors extracted from the telephoto image shown in FIG. 12. Since only the subject of the wide angle image has been described in the examples shown in FIGS. 11 to 14, the true movement vectors are not extracted from the telephoto image of FIG. 12, as shown in FIG. 14.

Extraction of True Movement Vectors Based on Degrees of Certainty (Second Example)

Figure 15:
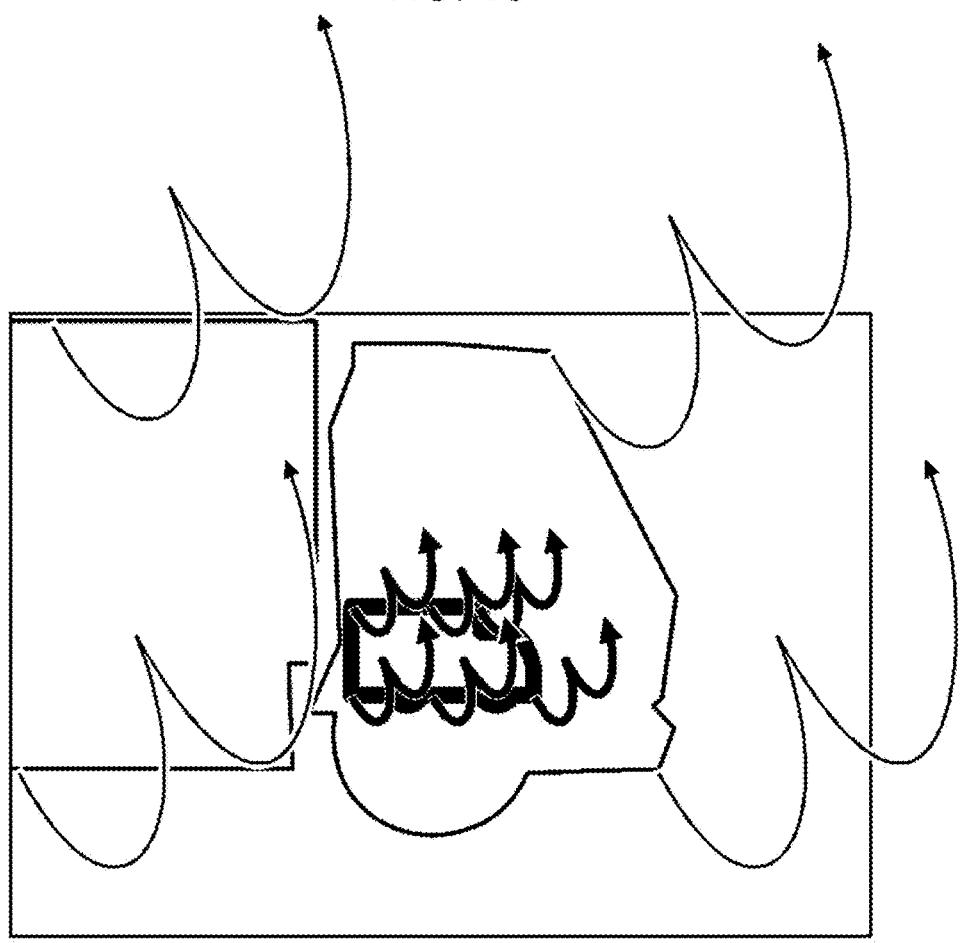
FIG. 15 is a diagram showing a subject image and movement vectors of the wide angle image.

Next, the extraction of the true movement vectors in a case where the false image resulting from the interference appears on the wide angle image and the telephoto image will be described. FIG. 15 is a diagram showing the subject image (represented by the outline) extracted and the movement vectors detected from the wide angle image shown in FIG. 9, and shows a case where a false subject image (large freight vehicle image) resulting from the interference of the telephoto image appears in addition to the original subject image (small freight vehicle image in the center of this diagram). Meanwhile, FIG. 16 is a diagram showing the subject image (represented by the outline) extracted and the movement vectors detected from the telephoto image shown in FIG. 10, and shows a case where a false subject image (small freight vehicle image in the center of this diagram) resulting from the interference of the wide angle image appears in addition to the original subject image (large freight vehicle image).

Figure 16:
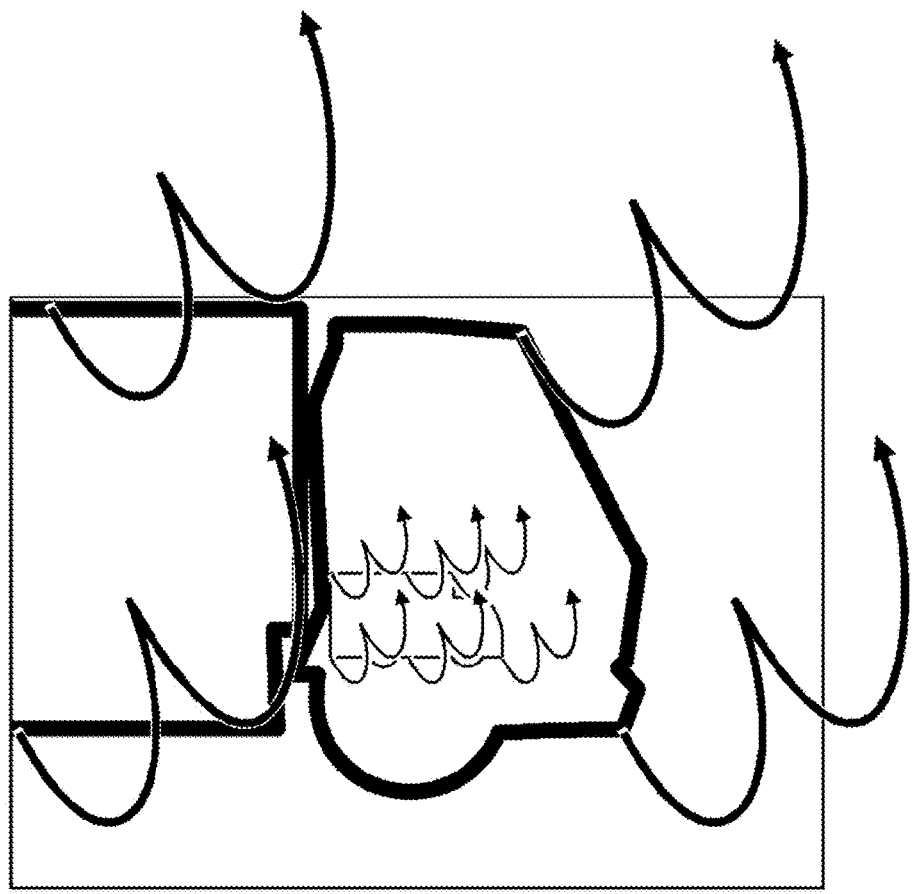
FIG. 16 is a diagram showing a subject image and movement vectors of the telephoto image.

In FIGS. 15 and 16, the degree of certainty of the movement vector is represented by the thickness of the vector.

Figure 17:
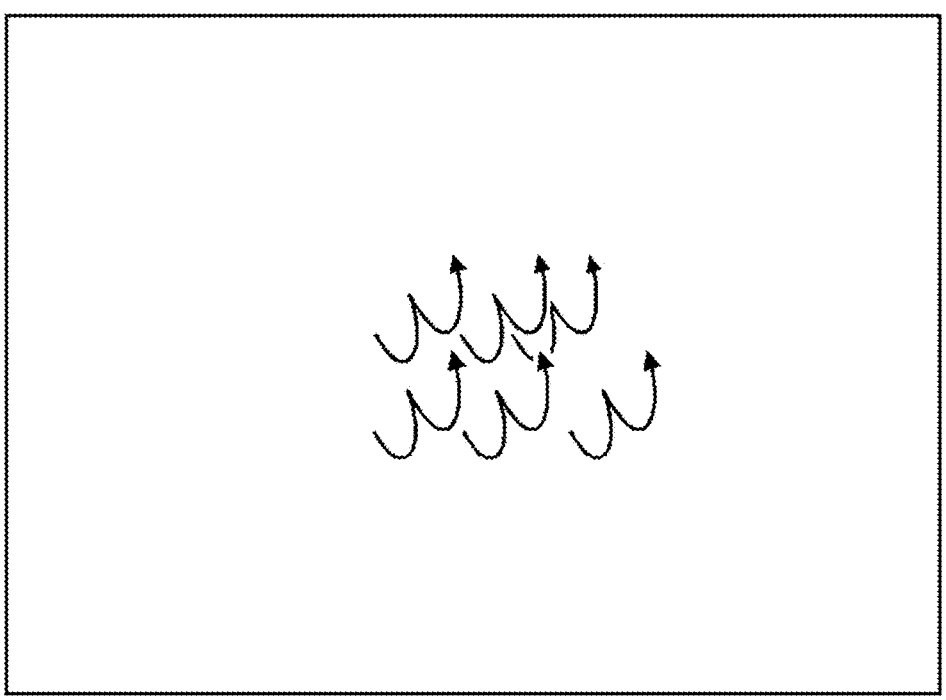
FIG. 17 is a diagram showing the true movement vectors extracted from the wide angle image.
Figure 18:
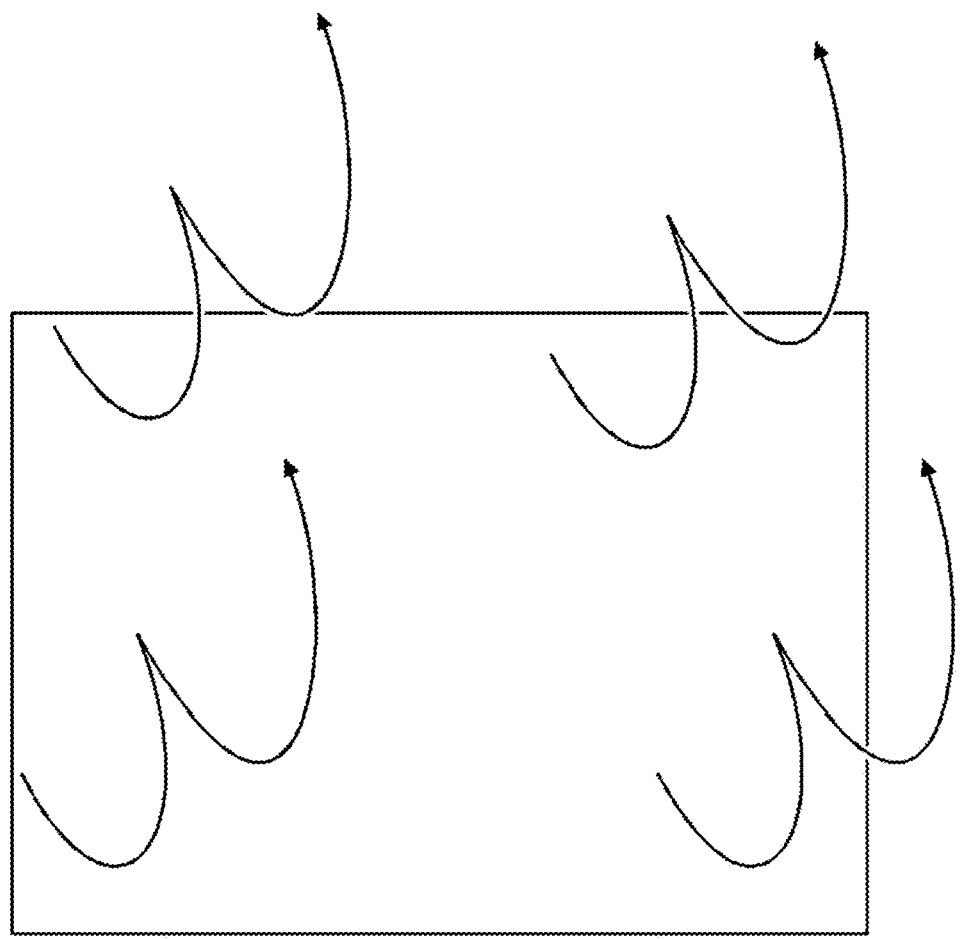
FIG. 18 is a diagram showing the true movement vectors extracted from the telephoto image.

Similarly to the cases of FIGS. 11 and 12, in the cases shown in FIGS. 15 and 16, in a case where there are the movement vectors having the same orient and the same magnitude in the same position between these images, it is determined that the movement vectors having lower degrees of certainty are false movement vectors resulting from the interference, and the true movement vectors are extracted. FIG. 17 shows the true movement vectors extracted from the wide angle image, and FIG. 18 shows the true movement vectors extracted from the telephoto image.

Camera Shake Correction

Figure 19:
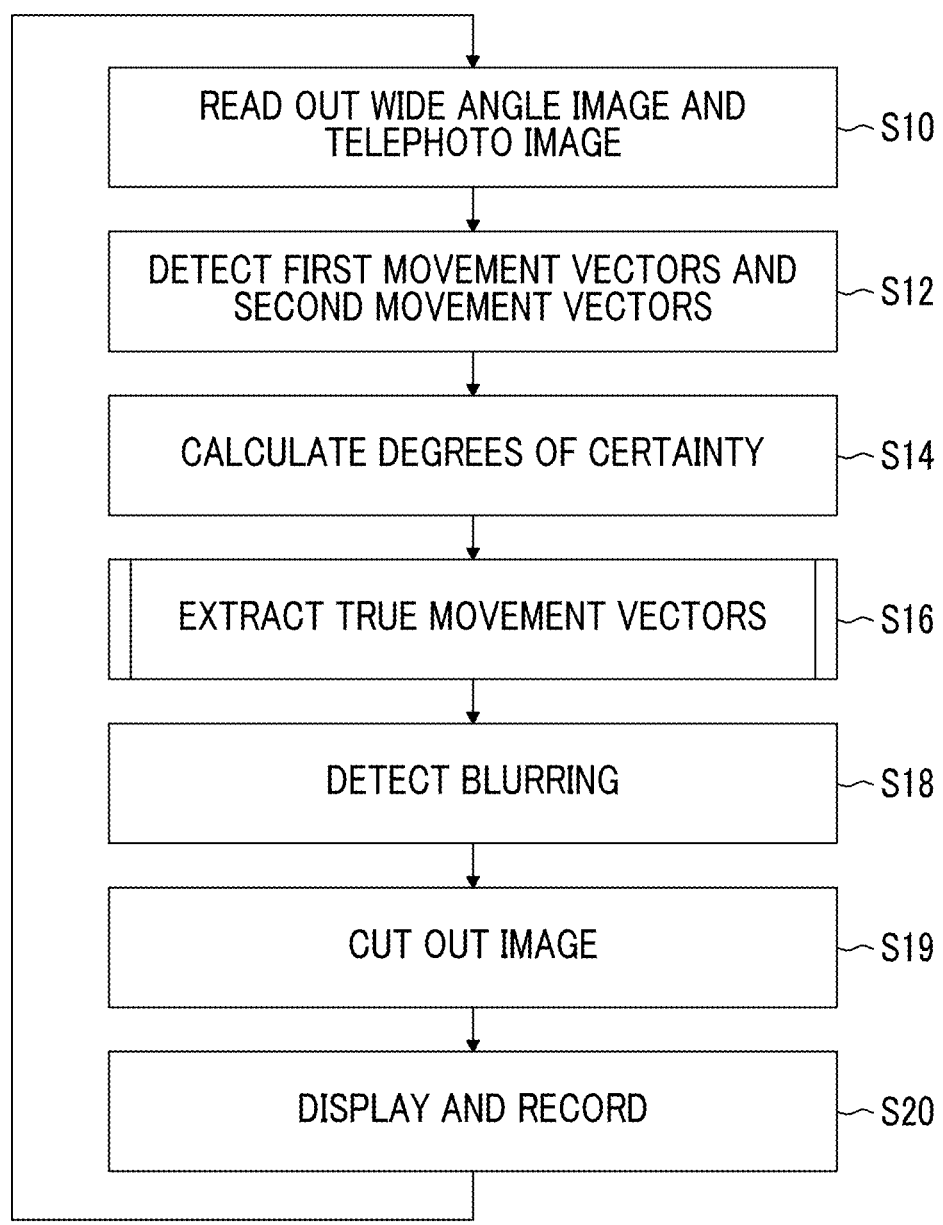
FIG. 19 is a flowchart showing a camera shake correcting process.

FIG. 19 is a flowchart showing a camera shake correcting process according to an imaging method of the digital camera 10. For example, a program for performing this process may be stored in the main controller 37 and/or the recording unit 40. Computer-readable codes of the program may be recorded in a non-transitory recording medium such as a compact disc (CD), a digital versatile disc (DVD), a hard disk, and/or a semiconductor memory, which is available as the recording unit.

Initially, in step S10, the image generating unit 32 obtains the image signals indicating the wide angle image (an example of the first image) and the image signals indicating the telephoto image (an example of the second image) from the imaging element 24, and generates the first image data and the second image data (an example of an image reading-out step). In this example, a plurality of first image data items and a plurality of second image data items are continuously obtained at time intervals.

Subsequently, in step S12, the image processing unit 38 detects the movement vectors of the subject for the first image data items and the second image data items (an example of a movement vector detecting step). The detection of the movement vectors is performed by detecting first feature points of the subject in the plurality of first image data items continuously obtained. The movement vectors (an example of first movement vectors) on the wide angle image are detected based on differences between the corresponding feature points. Similarly, second feature points of the subject on the telephoto image are detected from the plurality of second image data items, and the movement vectors (an example of second movement vectors) on the telephoto image are detected.

As described above, the true movement vectors and the false movement vectors resulting from the false image are present in the first movement vectors and the second movement vectors detected in this example. The true movement vectors and the false movement vectors have different magnitudes due to a difference in an angle of view between the first optical system 21 and the second optical system 22. Accordingly, a plurality of movement vectors having magnitudes different from each other is detected as the first movement vectors and the second movement vectors.

Figure 20:
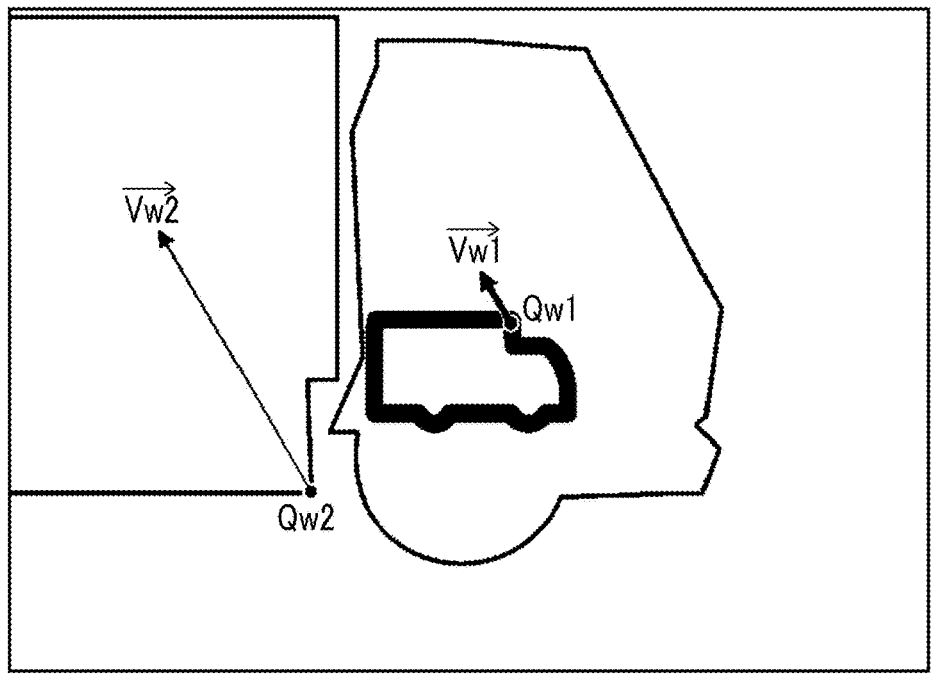
FIG. 20 is a diagram showing examples of the wide angle image and first movement vectors detected from the wide angle image.

FIG. 20 is a diagram showing examples of the wide angle image and the first movement vectors detected from the wide angle image. In this example, a movement vector $\vec{V}w1$ is detected in a feature point Qw1, and a movement vector $\vec{V}w2$ is detected in a feature point Qw2, as the first movement vectors in the first feature points of the wide angle image. In the present specification, it is assumed that "→" indicates the vector.

Figure 21:
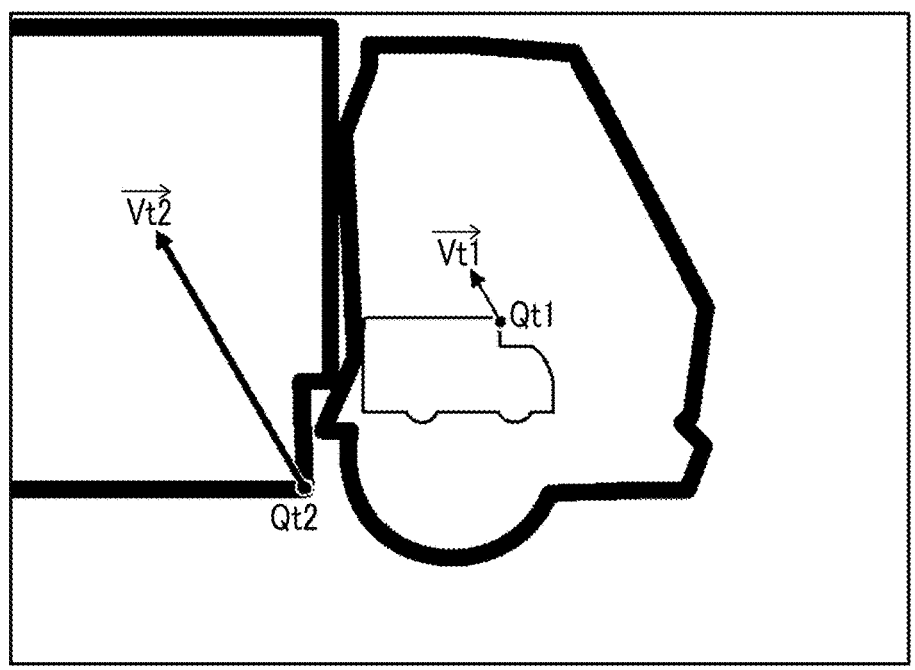
FIG. 21 is a diagram showing examples of the telephoto image and second movement vectors detected from the telephoto image.

FIG. 21 is a diagram showing examples of the telephoto image and the second movement vectors detected from the telephoto image. In this example, a movement vector $\vec{V}t1$ is detected in a feature point Qt1, and a movement vector $\vec{V}t2$ is detected in a feature point Qt2, as the second movement vectors in the second feature points of the telephoto image.

Subsequently, in step S14, the image processing unit 38 calculates the degrees of certainty of the first movement vectors and the second movement vectors (an example of a certainty degree calculating step). In this example, it is assumed that degrees of certainty (an example of first degrees of certainty) indicating that the movement vectors $\vec{V}w1$ and $\vec{V}w2$ which are the first movement vectors are movement vectors resulting from the luminous flux passed through the wide angle optical system are respectively Pw1 and Pw2 and degrees of certainty (an example of second degrees of certainty) indicating that the movement vectors $\vec{V}t1$ and $\vec{V}t2$ which are the second movement vectors are movement vectors resulting from the luminous flux passed through the telephoto optical system are respectively Pt1 and Pt2.

The degrees of certainty Pw1 and Pt1 may be calculated based on a brightness signal in the feature point Qw1 on the wide angle image and a brightness signal in the feature point Qt1 (the feature point Qt1 corresponding to the feature point Qw1) present in the same position as that of the feature point Qw1 on the telephoto image. Similarly, the degrees of certainty Pw2 and Pt2 may be calculated based on a brightness signal in the feature point Qw2 on the wide angle image and a brightness signal in the feature point Qt2 (the feature point Qt2 corresponding to the feature point Qw2) present in the same position as that of the feature point Qw2 on the telephoto image. In this example, it is assumed that the relationship of Pw1>Pt1 and Pw2<Pt2 is satisfied.

Figure 22:
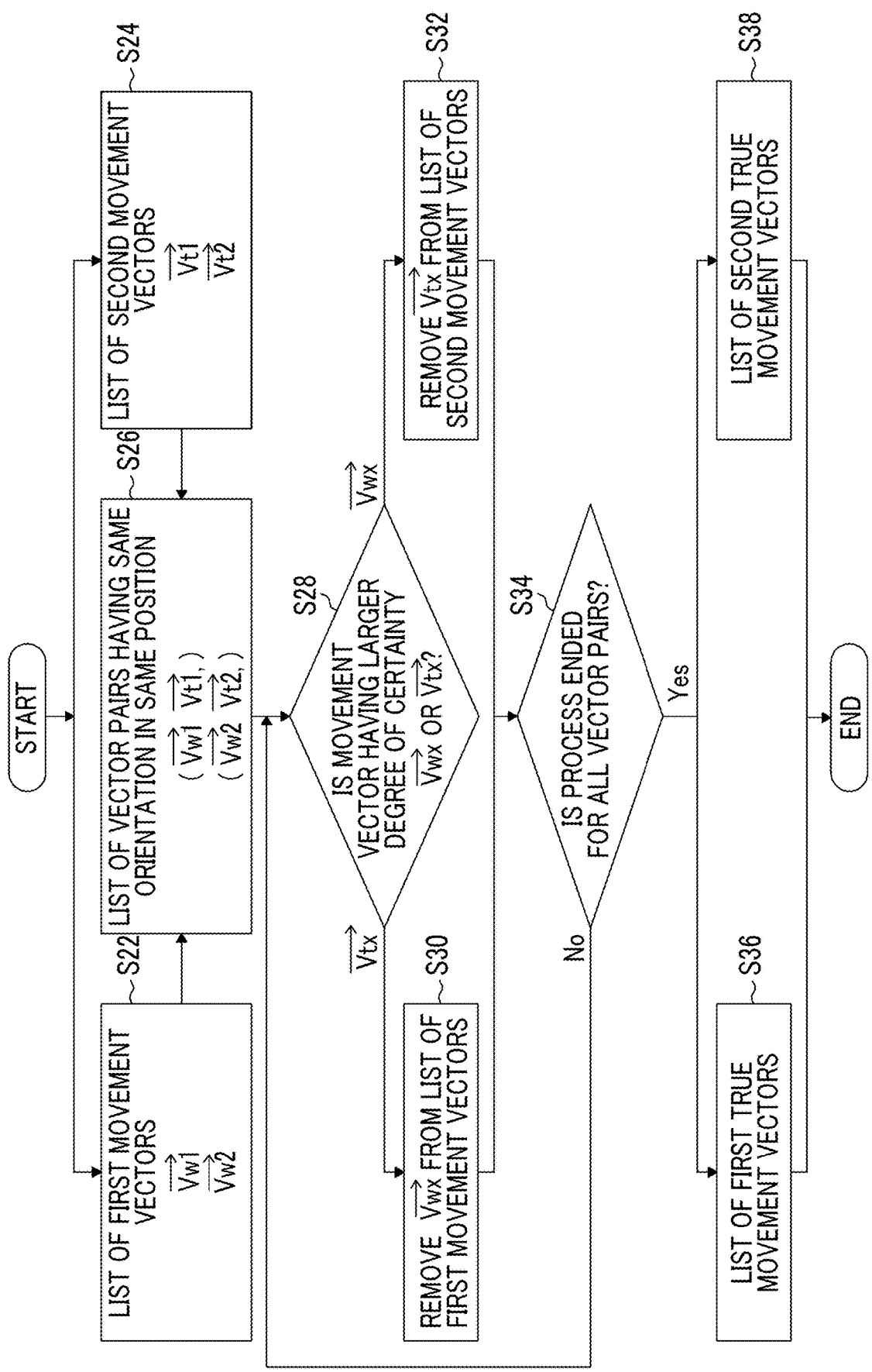
FIG. 22 is a flowchart showing the details of a process of extracting the true movement vectors.

Thereafter, in step S16, the image processing unit 38 extracts the true movement vectors (an example of a movement vector extracting step). FIG. 22 is a flowchart showing the details of a process of extracting the true movement vectors using the image processing unit 38 in step S16.

Initially, in step S22, a list of first movement vectors is created based on the movement vectors detected in step S12. In the example of the wide angle image shown in FIG. 20, the movement vectors $\vec{V}w1$ and $\vec{V}w2$ are created as the list.

Similarly, in step S24, a list of second movement vectors is created based on the movement vectors detected in step S12. In the example of the telephoto image shown in FIG. 21, the movement vectors $\vec{V}t1$ and $\vec{V}t2$ are created as the list.

Subsequently, in step S26, a list of vector pairs having the same position and the same orientation between the wide angle image and the telephoto image is created from the lists created in steps S22 and S24. In the examples of FIGS. 20 and 21, the vector pairs ($\vec{V}w1$, $\vec{V}t1$) and ($\vec{V}w2$, $\vec{V}t2$) are created as the list.

Subsequently, in step S28, the degrees of certainty are compared between the movement vectors constituting the vector pair. The degrees of certainty of the movement vectors constituting the vector pair are calculated in step S14. In a case where the vector pair is ($\vec{V}w1$, $\vec{V}t1$), the degree of certainty Pw1 of the first movement vector $\vec{V}w1$ and the degree of certainty Pt1 of the second movement vector $\vec{V}t1$ are compared.

In step S28, in a case where it is determined that the degree of certainty of the second movement vector $\vec{V}tx$ (x=1, 2) is greater (higher) than the degree of certainty of the first movement vector $\vec{V}wx$ (x=1, 2) (in a case where the degree of certainty of the first movement vector $\vec{V}wx$ (x=1, 2) is equal to or less than the degree of certainty of the second movement vector $\vec{V}tx$ (x=1, 2)), the process proceeds to step S30, and the second movement vector of this vector pair is extracted as the true movement vector. It is determined that the first movement vector $\vec{V}wx$ is the false movement vector resulting from the interference, and the false movement vector is removed from the list of first movement vectors created in step S22.

Meanwhile, in a case where it is determined that the degree of certainty of the first movement vector $\vec{V}wx$ is greater than the degree of certainty of the second movement vector $\vec{V}tx$ in step S28, the process proceeds to step S32, and the first movement vector of this vector pair is extracted as the true movement vector. It is determined that the second movement vector $\vec{V}tx$ is the movement vector resulting from the interference, and this movement vector is removed from the list of second movement vectors created in step S24.

In a case where the vector pair is ($\vec{V}w1$, $\vec{V}t1$), since the relationship of Pw1>Pt1 is satisfied, the first movement vector $\vec{V}w1$ is extracted as the true movement vector, it is determined that the second movement vector $\vec{V}t1$ is the false movement vector, and the false movement vector is removed from the list of second movement vectors.

In a case where the vector pair is ($\vec{V}w2$, $\vec{V}t2$), since the relationship of Pw2<Pt2, the second movement vector $\vec{V}t2$ is extracted as the true movement vector, it is determined that the first movement vector $\vec{V}w2$ is the false movement vector, and the false movement vector is removed from the list of first movement vectors.

Thereafter, in step S34, it is determined whether or not the process in step S28 is ended for all the vector pairs. In a case where the process in step S28 is not ended for all the vector pairs, the process proceeds to step S28, and the same process is repeated.

In a case where the process in step S28 is ended for all the vector pairs, the process proceeds to step S36, and a list of first true movement vectors is created by removing the corresponding first movement vector in step S30 from the list of first movement vectors. Similarly, in step S38, a list of second true movement vectors is created by removing the corresponding second movement vector in step S32 from the list of second movement vectors.

Referring back to FIG. 19, in step S18, the camera shake correction unit 39 detects first blurring (an example of first blurring) of the wide angle image and second blurring (an example of second blurring) of the telephoto image resulting from the shake (an example of a shake of the imaging unit) of the imaging unit 14 based on the list of first true movement vectors and the list of second true movement vectors (an example of a blurring detecting step). The first true movement vectors and the second true movement vectors are obtained by combining vector components resulting from the shake of the imaging unit 14 and vector components resulting from the movement of the subject. The known method may be used as a method of detecting the vector components resulting from the shake of the imaging unit 14.

The blurring capable of being detected on the telephoto image has a resolution higher than the blurring capable of being detected on the wide angle image. Accordingly, the second blurring of the telephoto image may be detected from the list of second true movement vectors, and the first blurring of the wide angle image may be detected based on the detected second blurring and a ratio between the focal lengths of the first optical system 21 and the second optical system 22. It is possible to detect the second blurring of the telephoto image based on the detected first blurring and the ratio between the focal lengths.

In step S19 (an example of an electronic shake correcting step), the camera shake correction unit 39 cuts out the image according to the detected first blurring and second blurring.

Figure 23:
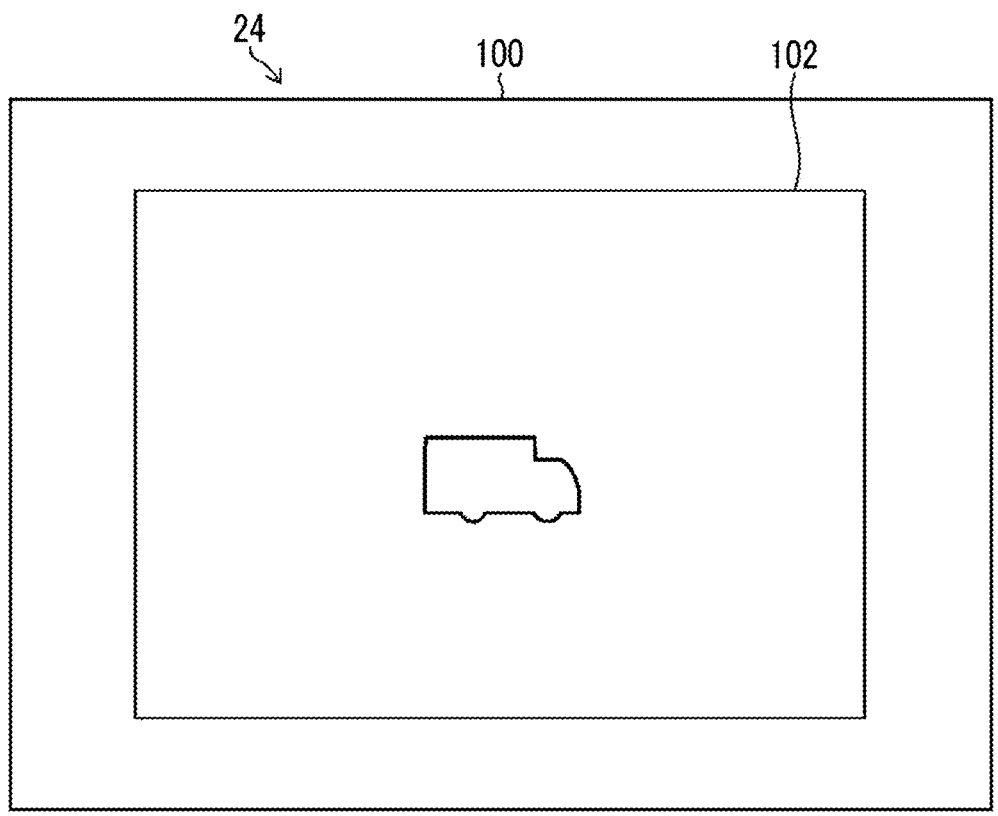
FIG. 23 is a diagram showing an imaging region and a cutout region of the imaging element.
Figure 24:
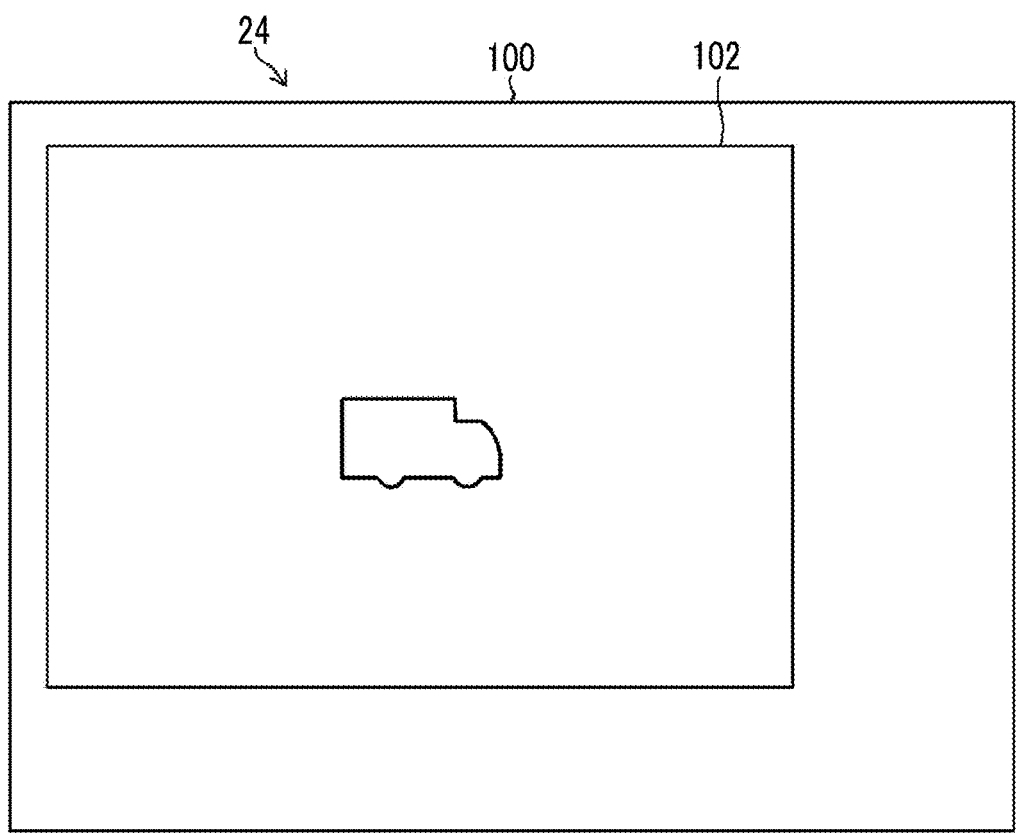
FIG. 24 is a diagram showing an imaging region and a cutout region of the imaging element.

FIG. 23 is a diagram showing an imaging region 100 corresponding to the entire light receiving surface of the imaging element 24 and a cutout region 102 in which the recording in the recording unit 40 and/or the displaying on the display unit 42 are performed. In this example, the wide angle image captured by the first sensor group 24a (see FIG. 3) is shown. FIG. 24 is a wide angle image captured at a time interval from the wide angle image shown in FIG. 23. In FIGS. 23 and 24, the illustration of an interference image of the telephoto image is omitted.

Figure 25:
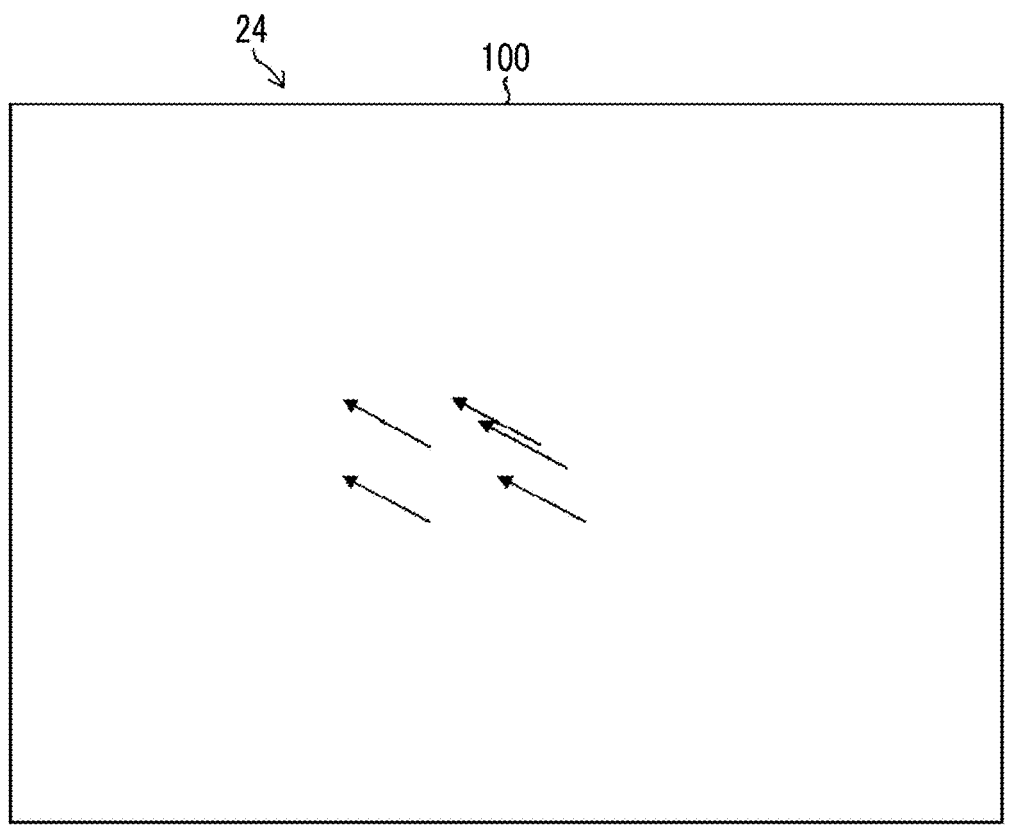
FIG. 25 is a diagram showing the true movement vectors extracted from the wide angle image.

First true movement vectors extracted from two wide angle images are shown in FIG. 25. The camera shake correction unit 39 detects first blurring from the first true movement vectors. In this example, since the freight vehicle of the subject is stopping, the first blurring of the wide angle image resulting from the shake of the imaging unit 14 is equivalent to the first true movement vectors.

The camera shake correction unit 39 determines a position of the cutout region 102 of the first image data generated by the image generating unit 32 according to the first blurring of the wide angle image, and cuts out the first image data in the determined position. In this example, the position of the cutout region 102 of the wide angle image shown in FIG. 24 is moved from the position of the cutout region 102 shown in FIG. 23 in the directions of the first true movement vectors shown in FIG. 25 with the quantities thereof.

Figure 26:
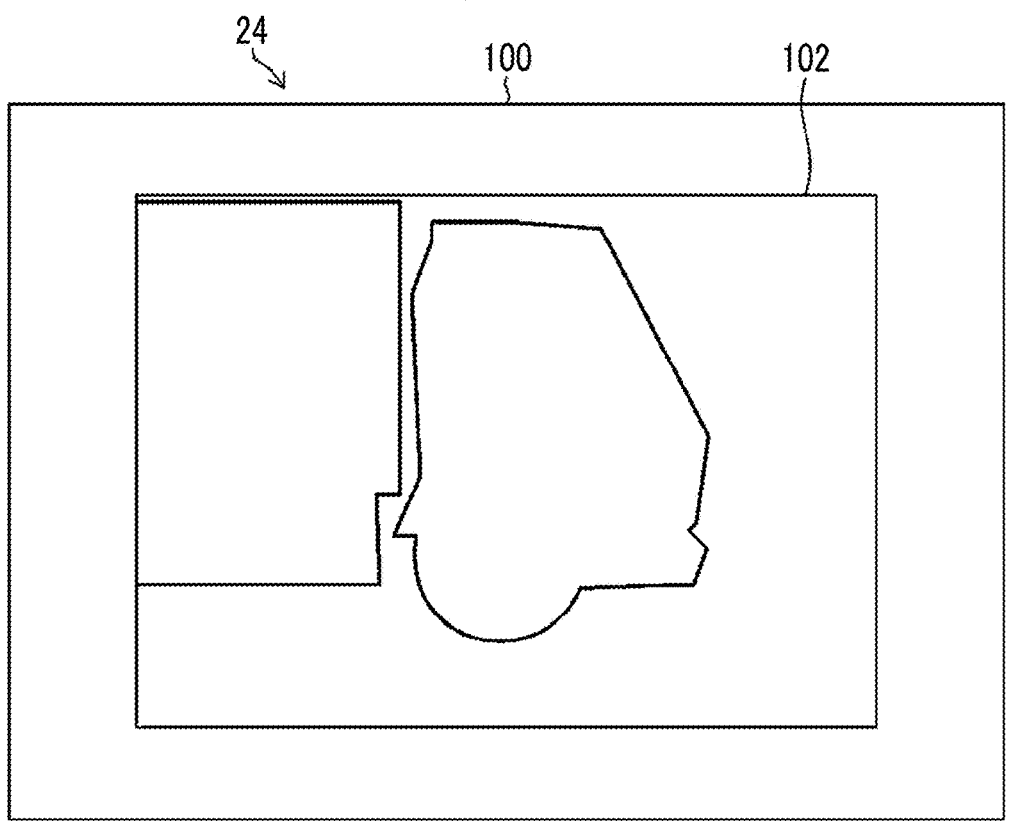
FIG. 26 is a diagram showing an imaging region and a cutout region of the imaging element.
Figure 27:
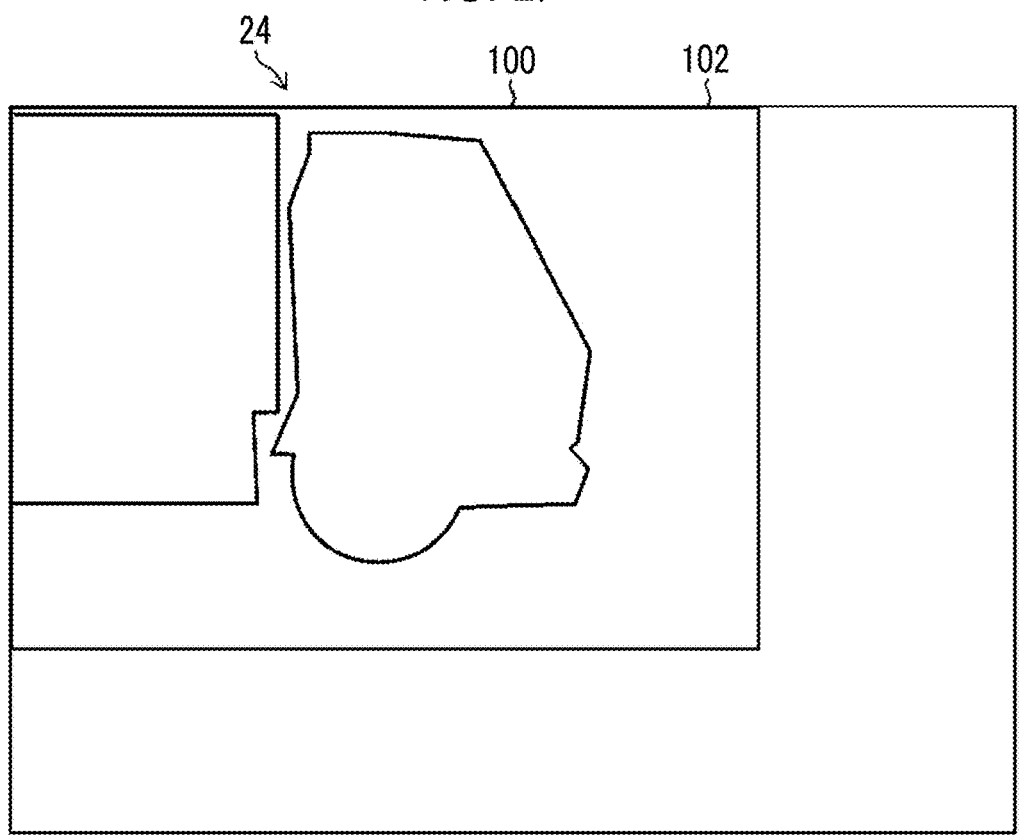
FIG. 27 is a diagram showing an imaging region and a cutout region of the imaging element.

FIG. 26 is a diagram showing the imaging region 100 and the cutout region 102 of the imaging element 24, and shows the telephoto image captured by the second sensor group 24b (see FIG. 3). FIG. 27 shows the telephoto image captured at a time interval from the telephoto image shown in FIG. 26. In FIGS. 26 and 27, the illustration of an interference image of the wide angle image is omitted.

Figure 28:
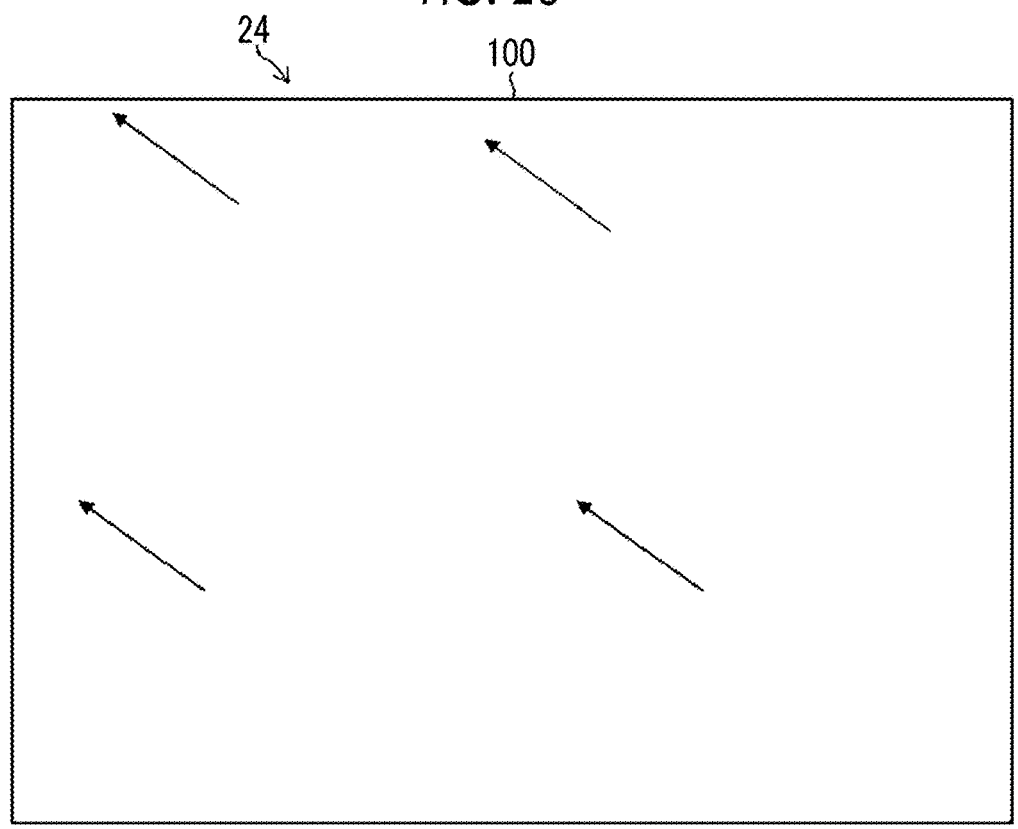
FIG. 28 is a diagram showing the true movement vectors extracted from the telephoto image.

The second true movement vectors extracted from these two telephoto images are shown in FIG. 28. The camera shake correction unit 39 detects the second blurring from the second true movement vectors. In this example, the second blurring of the telephoto image resulting from the shake of the imaging unit 14 is equivalent to the second true movement vectors.

The camera shake correction unit 39 determines a position of the cutout region 102 of the second image data generated by the image generating unit 32 according to the second blurring of the telephoto image, and cuts out the second image data in the determined position. In this example, the position of the cutout region 102 of the telephoto image shown in FIG. 27 is moved from the position of the cutout region 102 shown in FIG. 26 in the directions of the second true movement vectors shown in FIG. 28 with the quantities thereof.

At the end, in step S20, the cutout region 102 cut out in step S18 is recorded in the recording unit 40, and is displayed on the display unit 42 by the display controller 41.

Accordingly, even though image blurring corresponding to the true movement vectors occurs due to the shake of the imaging unit 14 on the wide angle image shown in FIG. 23 and the wide angle image shown in FIG. 24, the subject is displayed in the same position of the display unit 42. Similarly, even though image blurring corresponding to the true movement vectors occurs on the telephoto image shown in FIG. 26 and the telephoto image shown in FIG. 27, the subject is displayed in the same position of the display unit 42.

As described above, since the digital camera 10 according to the first embodiment extracts the true movement vectors based on the degrees of certainty and detects the shake of the imaging unit 14, it is possible to ascertain the shake of the imaging unit 14 even though there is the interference, and it is possible to easily cope with the interference. Since the image obtained by moving the position of the cutout region of the image and cutting out the image in the position is displayed on the display unit based on the detected shake, it is possible to reduce the blurring of the image to be displayed and/or recorded even though there is the interference.

In the first embodiment, in order to reduce the blurring of the image, the true movement vectors may be extracted, and it is not necessary to create the image in which the interference is removed. That is, note that it is not necessary to generate the images shown in FIGS. 7 and 8 by performing the image processing on the images shown in FIGS. 9 and 10.

Second Embodiment of Imaging Unit

Figure 29:
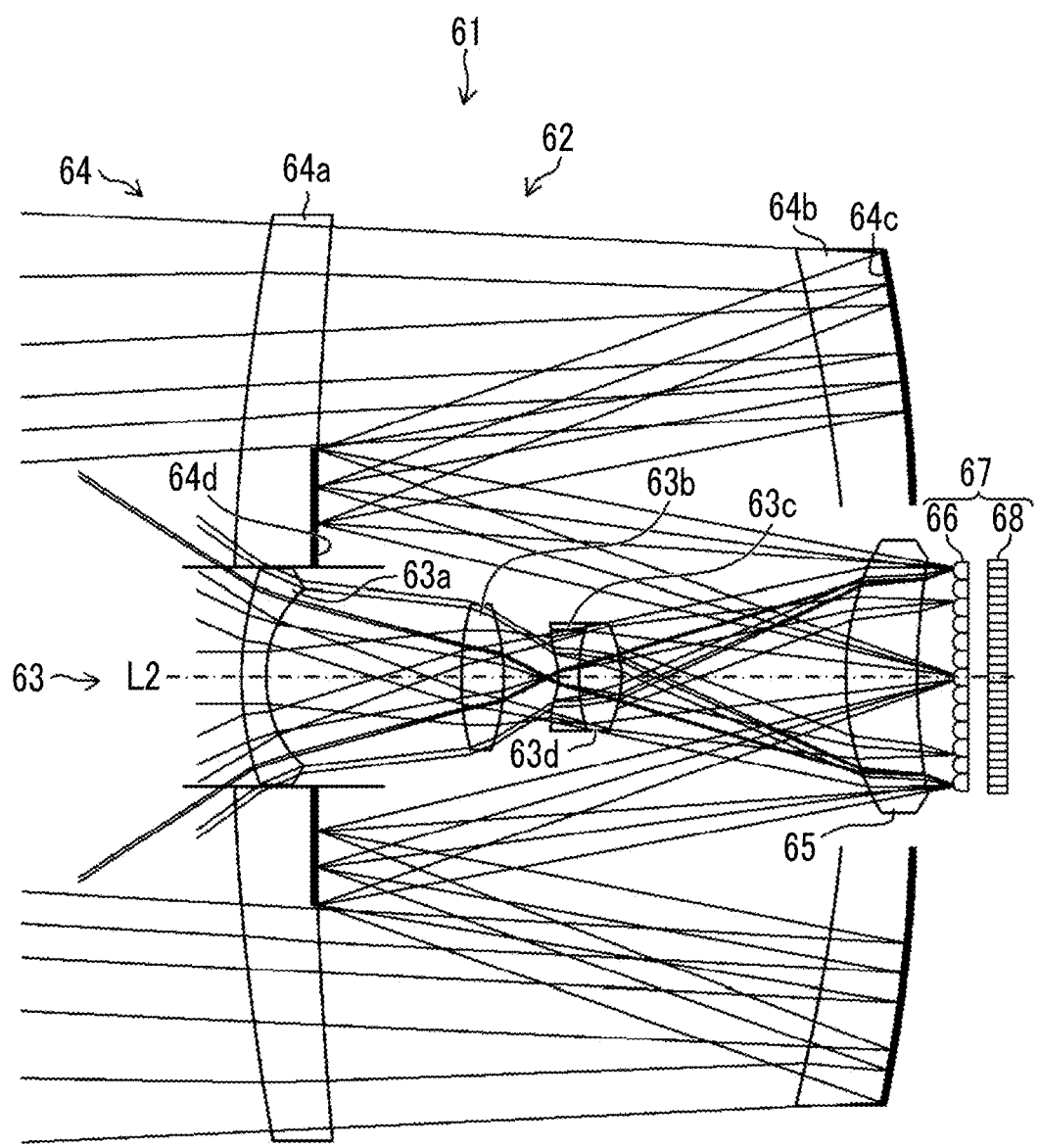
FIG. 29 is a cross-sectional view showing a second embodiment of the imaging unit.

Next, a second embodiment of the imaging unit will be described. FIG. 29 is a cross-sectional view showing an imaging unit 61 according to a second embodiment. As shown in this diagram, the imaging unit 61 is constituted by an imaging optical system 62 and a directional sensor 67.

The imaging optical system 62 is constituted by a central optical system 63 provided in a central part as a first optical system, and a ring-shaped optical system 64 concentrically provided at an edge part thereof as a second optical system, which are arranged on the same optical axis L2.

The central optical system 63 is a wide angle optical system constituted by a first lens 63a, a second lens 63b, a third lens 63c, a fourth lens 63d, and a common lens 65, and forms a wide angle image on a microlens array 66 constituting the directional sensor 67.

The ring-shaped optical system 64 is a telephoto optical system constituted by a first lens 64a, a second lens 64b, a first reflection mirror 64c and a second reflection mirror 64d which are reflection optical systems, and the common lens 65, and forms a telephoto image on the microlens array 66. Luminous flux incident through the first lens 64a and the second lens 64b is reflected from the first reflection mirror 64c and the second reflection mirror 64d two times, and passes through the common lens 65. Luminous flux is turned by the first reflection mirror 64c and the second reflection mirror 64d, and thus, a length of the telephoto optical system having a long focal length in an optical axis direction is shortened.

The directional sensor 67 is constituted by the microlens array 66 and an image sensor 68.

Figure 30:
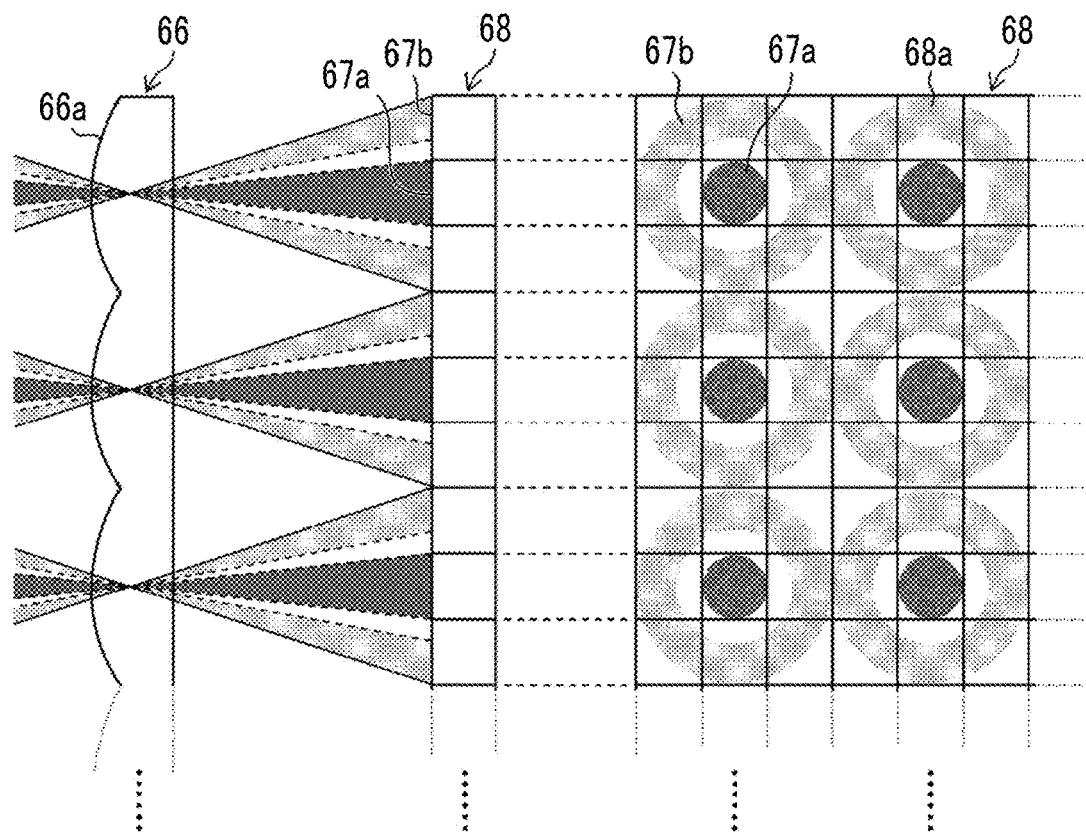
FIG. 30 shows a cross-sectional view and a plan view of a directional sensor.

FIG. 30 shows a cross-sectional view and a plan view of major parts of the microlens array 66 and the image sensor 68. The microlens array 66 is configured such that a plurality of microlenses (pupil image forming lens) 66a is arranged in a two-dimensional shape. The size of one microlens 66a in a horizontal direction and a vertical direction is the size of three light receiving cells 68a which are photoelectric conversion elements of the image sensor 68, and (3×3) number of light receiving cells 68a in a lattice form (square grid) are arranged so as to correspond to one microlens 66a. Hereinafter, one microlens 66a and a light receiving cell group ((3×3) number of light receiving cells 68a) corresponding to one microlens 66a are used as a unit block.

Each microlens 66a of the microlens array 66 forms a circular central pupil image (first pupil image) 67a corresponding to the central optical system 63 of the imaging optical system 62 in the central light receiving cell 68a of the unit block, and forms a ring-shaped pupil image (second pupil image) 67b corresponding to the ring-shaped optical system 64 in eight light receiving cells 68a in the periphery of the unit block.

According to the imaging unit 61 having the aforementioned configuration, it is possible to simultaneously image a wide angle image corresponding to the central optical system 63 and a telephoto image (an image has an imaging magnification greater than that of the wide angle image) corresponding to the ring-shaped optical system 64.

A color filter array constituted by R (red), G (green), and B (blue) color filters (optical filters) provided so as to correspond to the light receiving cells is provided in the image sensor 68, and a demosaicing process is performed on colors images (mosaic images) obtained so as to correspond to a color array pattern of the color filter array. Accordingly, a color wide angle image and a color telephoto image are obtained.

It is possible to perform a process of detecting the movement vectors and extracting the true movement vectors on the wide angle image and the telephoto image obtained by the imaging unit 61 similarly to the first embodiment. Accordingly, it is also possible to reduce the blurring of the motion picture even though there is the interference in the second embodiment.

Third Embodiment of Imaging Unit

Figure 31:
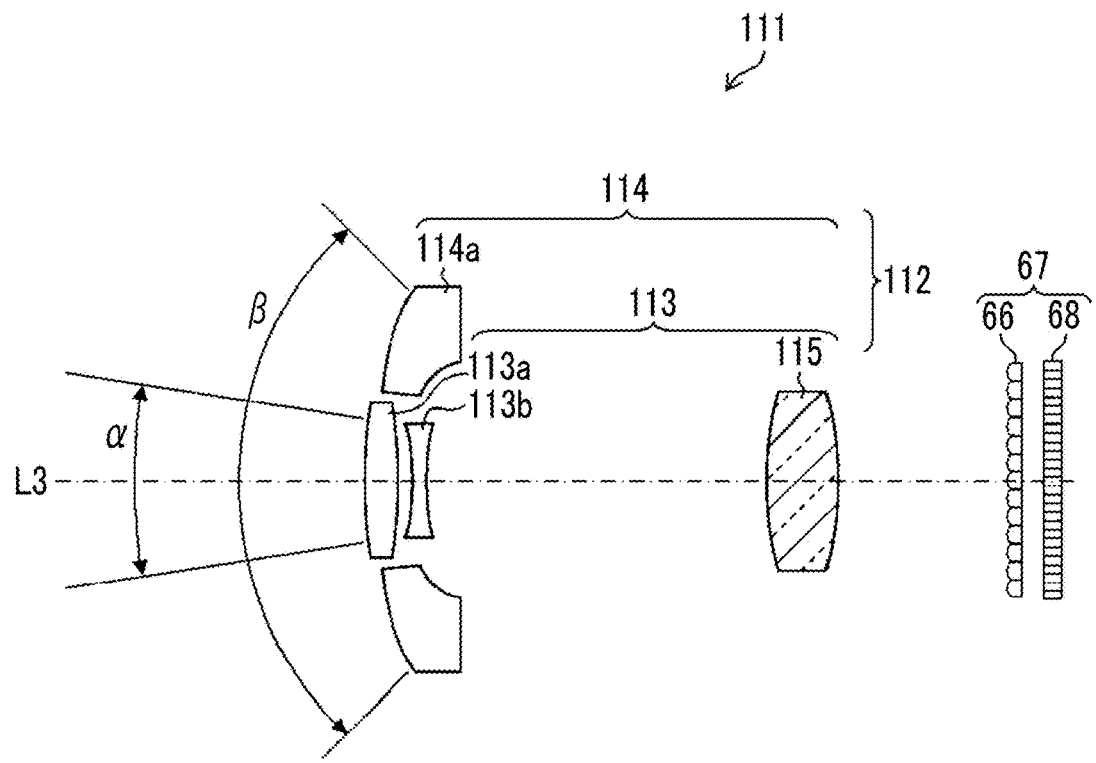
FIG. 31 is a cross-sectional view of a third embodiment of the imaging unit.

A third embodiment of the imaging unit will be described. FIG. 31 is a cross-sectional view showing an imaging unit 111 according to the third embodiment. As shown in this diagram, the imaging unit 111 comprises an imaging optical system 112 and a directional sensor 67. The directional sensor 67 is the same as that shown in FIGS. 29 and 30.

The imaging optical system 112 is constituted by a central optical system 113 (first optical system) provided in a central part and a ring-shaped optical system 114 (second optical system) provided at an edge part thereof which are arranged on the same optical axis L3. The central optical system 113 is a telephoto optical system constituted by a first lens 113a, a second lens 113b, and a common lens 115, and has an angle of view α. Meanwhile, the ring-shaped optical system 114 is a wide angle optical system constituted by a lens 114a and a common lens 115, and has an angle of view β (β>α) which is greater than the angle of view of the central optical system 113.

The imaging optical system 112 is different from the imaging optical system 62 shown in FIG. 29 in that the reflection mirror is not used, the central optical system 113 is the telephoto optical system, and the ring-shaped optical system 114 is the wide angle optical system.

It is possible to perform a process of detecting the movement vectors and extracting the true movement vectors on the wide angle image and the telephoto image obtained by the imaging unit 111 similarly to the first embodiment. Accordingly, it is also possible to reduce the blurring of the motion picture even though there is the interference in the third embodiment.

Others

Although it has been described in the first to third embodiments that the first optical system is the circular optical system disposed in the central part and the second optical system is the ring-shaped optical system disposed at the edge part of the first optical system in the ring shape, the first and second optical systems of the imaging optical system according to the present invention may be arranged in different regions in a plane perpendicular to the optical axis (for example, it is assumed that the first and second optical systems are respectively semilunar optical systems).

Although it has been described in the first to third embodiments that the focal lengths (imaging angles of view) of the first optical system and the second optical system are different from each other, the different imaging characteristics in the first optical system and the second optical system are not limited to the focal lengths (imaging angles of view), and focusing distances and/or frequencies of transmission light rays may be different.

Although it has been described in the first to third embodiments that the optical systems (first and second optical systems) have the common optical axis, the optical axes of the optical systems may not be common in the present invention. In a case where the optical axes of the first and second optical systems form an angle which is not zero, a part of the imaging angles of view of the first and second optical systems may not overlap with each other.

In the present invention, the number of optical systems is not limited to two, and may be three or more. In a case where three or more optical systems are used, the first or second optical system may be further constituted by a plurality of optical systems.

The technical scope of the present invention is not limited to the scope described in the aforementioned embodiments. The configurations of the embodiments may be appropriately combined between the embodiments without departing from the gist of the present invention.

EXPLANATION OF REFERENCES

10: digital camera
11: imaging optical system
12: flash light emitting unit
13: release button
14: imaging unit
21: first optical system
21a: first wide angle lens
21b: second wide angle lens
21c: third wide angle lens
21d: fourth wide angle lens
22: second optical system
22a: first telephoto lens
22b: first telephoto reflector
22c: first telephoto reflection mirror
22d: second telephoto reflector
22e: second telephoto reflection mirror
23: common lens
24: imaging element
24a: first sensor group
24b: second sensor group
25: light receiving sensor
25a: first light receiving sensor
25b: second light receiving sensor
26: microlens
27: interlayer
28: light shielding mask
29: photodiode
32: image generating unit
37: main controller
38: image processing unit
39: camera shake correction unit
40: recording unit
41: display controller
42: display unit
43: user manipulation unit
61: imaging unit
62: imaging optical system
63: central optical system
63a: first lens
63b: second lens
63c: third lens 63d: fourth lens
64: ring-shaped optical system
64a: first lens
64b: second lens
64c: first reflection mirror
64d: second reflection mirror
65: common lens
66: microlens array
66a: microlens
67: directional sensor
68: image sensor
68a: light receiving cell
100: imaging region
102: cutout region
111: imaging unit
112: imaging optical system
113: central optical system
113a: first lens
113b: second lens
114: ring-shaped optical system
114a: lens
115: common lens
L: optical axis
L2: optical axis
L3: optical axis
Qt1: feature point
Qt2: feature point
Qw1: feature point
Qw2: feature point
S10 to S20: camera shake correction
S22 to S38: true movement vector extraction
T: telephoto image light
W: wide angle image light
α: angle of view
β: angle of view

What is claimed is:

1. An imaging device comprising:
an imaging unit that includes an imaging optical system constituted by a first optical system and a second optical system which are provided in different regions and have imaging characteristics different from each other, and a directional sensor which comprises a plurality of pixels constituted by photoelectric conversion elements arranged in a two-dimensional shape and selectively receives divided luminous flux obtained by dividing luminous flux incident through the first optical system and the second optical system through pupil division by using the plurality of pixels;
an image reading-out unit that obtains image signals of a first image obtained through the first optical system and image signals of a second image obtained through the second optical system from the directional sensor;
a movement vector detection unit that detects first movement vectors which are movement vectors of a subject on the first image and second movement vectors which are movement vectors of the subject on the second image;
a certainty degree calculation unit that calculates first degrees of certainty which are degrees of certainty indicating that the first movement vectors are movement vectors resulting from luminous flux passed through the first optical system and second degrees of certainty which are degrees of certainty indicating that second movement vectors are movement vectors resulting from luminous flux passed through the second optical system;
a movement vector extraction unit that extracts first true movement vectors which are movement vectors resulting from the luminous flux passed through the first optical system on the first image and second true movement vectors which are movement vectors resulting from the luminous flux passed through the second optical system on the second image based on the first movement vectors, the second movement vectors, the first degrees of certainty, and the second degrees of certainty; and
a blurring detection unit that detects first blurring of the first image resulting from a shake of the imaging unit based on the first true movement vectors and second blurring of the second image resulting from the shake of the imaging unit based on the second true movement vectors.

2. The imaging device according to claim 1, further comprising:
an electronic shake correction unit that displays the first image obtained by moving a position of a cutout region of the first image and cutting out the first image in the position based on the first blurring on a display unit, and displays the second image obtained by moving a position of a cutout region of the second image and cutting out the second image in the position based on the second blurring on the display unit.

3. The imaging device according to claim 1,
wherein one of the first optical system and the second optical system is a wide angle optical system, and the other one is a telephoto optical system which has an optical axis common to the wide angle optical system and has a focal length longer than a focal length of the wide angle optical system.

4. The imaging device according to claim 2,
wherein one of the first optical system and the second optical system is a wide angle optical system, and the other one is a telephoto optical system which has an optical axis common to the wide angle optical system and has a focal length longer than a focal length of the wide angle optical system.

5. The imaging device according to claim 3,
wherein the blurring detection unit detects the first blurring and the second blurring based on a ratio between the focal lengths of the first optical system and the second optical system.

6. The imaging device according to claim 4,
wherein the blurring detection unit detects the first blurring and the second blurring based on a ratio between the focal lengths of the first optical system and the second optical system.

7. The imaging device according to claim 1,
wherein the movement vector detection unit
detects first feature points of the subject from a plurality of the first images continuously obtained, and detects a plurality of the first movement vectors having magnitudes different from each other based on the detected first feature points, and
detects second feature points of the subject from a plurality of the second images continuously obtained, and detects a plurality of the second movement vectors having magnitudes different from each other based on the detected second feature points.

8. The imaging device according to claim 2,
wherein the movement vector detection unit
detects first feature points of the subject from a plurality of the first images continuously obtained, and detects a plurality of the first movement vectors having magnitudes different from each other based on the detected first feature points, and detects second feature points of the subject from a plurality of the second images continuously obtained, and detects a plurality of the second movement vectors having magnitudes different from each other based on the detected second feature points.

9. The imaging device according to claim 3, wherein the movement vector detection unit detects first feature points of the subject from a plurality of the first images continuously obtained, and detects a plurality of the first movement vectors having magnitudes different from each other based on the detected first feature points, and detects second feature points of the subject from a plurality of the second images continuously obtained, and detects a plurality of the second movement vectors having magnitudes different from each other based on the detected second feature points.

10. The imaging device according to claim 4, wherein the movement vector detection unit detects first feature points of the subject from a plurality of the first images continuously obtained, and detects a plurality of the first movement vectors having magnitudes different from each other based on the detected first feature points, and detects second feature points of the subject from a plurality of the second images continuously obtained, and detects a plurality of the second movement vectors having magnitudes different from each other based on the detected second feature points.

11. The imaging device according to claim 7, wherein the certainty degree calculation unit calculates the first degrees of certainty for the plurality of first movement vectors, and calculates the second degrees of certainty for the plurality of second movement vectors.

12. The imaging device according to claim 7, wherein the certainty degree calculation unit calculates the first degrees of certainty for the plurality of first movement vectors, and calculates the second degrees of certainty for the plurality of second movement vectors, based on brightness signals in the first feature points and brightness signals in feature points of the second feature points corresponding to the first feature points.

13. The imaging device according to claim 11, wherein the certainty degree calculation unit calculates the first degrees of certainty for the plurality of first movement vectors, and calculates the second degrees of certainty for the plurality of second movement vectors, based on brightness signals in the first feature points and brightness signals in feature points of the second feature points corresponding to the first feature points.

14. The imaging device according to claim 1, wherein, in a case where the first degree of certainty for one movement vector of the plurality of first movement vectors is greater than the second degree of certainty for the second movement vector corresponding to the one movement vector, the movement vector extraction unit determines that the second movement vector corresponding to the one movement vector is a movement vector resulting from an interference to the second optical system from the first optical system, and extracts the one movement vector as the first true movement vector, and in a case where the first degree of certainty for the one movement vector is equal to less than the second degree of certainty for the second movement vector corresponding to the one movement vector, the movement vector extraction unit determines that the one movement vector is a movement vector resulting from an interference to the first optical system from the second optical system, and extracts the second movement vector as the second true movement vector.

15. The imaging device according to claim 2, wherein, in a case where the first degree of certainty for one movement vector of the plurality of first movement vectors is greater than the second degree of certainty for the second movement vector corresponding to the one movement vector, the movement vector extraction unit determines that the second movement vector corresponding to the one movement vector is a movement vector resulting from an interference to the second optical system from the first optical system, and extracts the one movement vector as the first true movement vector, and in a case where the first degree of certainty for the one movement vector is equal to less than the second degree of certainty for the second movement vector corresponding to the one movement vector, the movement vector extraction unit determines that the one movement vector is a movement vector resulting from an interference to the first optical system from the second optical system, and extracts the second movement vector as the second true movement vector.

16. The imaging device according to claim 1, wherein the imaging optical system is an imaging optical system configured such that the first optical system is disposed in a central part and the second optical system is disposed at an edge part of the first optical system in a ring shape.

17. The imaging device according to claim 2, wherein the imaging optical system is an imaging optical system configured such that the first optical system is disposed in a central part and the second optical system is disposed at an edge part of the first optical system in a ring shape.

18. An imaging method of an imaging device comprising an imaging unit that includes an imaging optical system constituted by a first optical system and a second optical system which are provided in different regions and have imaging characteristics different from each other, and a directional sensor which comprises a plurality of pixels constituted by photoelectric conversion elements arranged in a two-dimensional shape and selectively receives divided luminous flux obtained by dividing luminous flux incident through the first optical system and the second optical system through pupil division by using the plurality of pixels, the method comprising:

an image reading-out step of obtaining image signals of a first image obtained through the first optical system and image signals of a second image obtained through the second optical system from the directional sensor;

a movement vector detecting step of detecting first movement vectors which are movement vectors of a subject on the first image and second movement vectors which are movement vectors of the subject on the second image;

a certainty degree calculating step of calculating first degrees of certainty which are degrees of certainty indicating that the first movement vectors are movement vectors resulting from luminous flux passed through the first optical system and second degrees of certainty which are degrees of certainty indicating that the second movement vectors are movement vectors resulting from luminous flux passed through the second optical system;

a movement vector extracting step of extracting first true movement vectors which are movement vectors resulting from the luminous flux passed through the first optical system on the first image and second true movement vectors which are movement vectors resulting from the luminous flux passed through the second optical system on the second image based on the first movement vectors, the second movement vectors, the first degrees of certainty, and the second degrees of certainty; and a blurring detecting step of detecting first blurring of the first image resulting from a shake of the imaging unit based on the first true movement vectors, and detecting second blurring of the second image resulting from the shake of the imaging unit based on the second true movement vectors.

19. The imaging method according to claim 18, further comprising:

an electronic shake correcting step of displaying the first image obtained by moving a position of a cutout region of the first image and cutting out the first image in the position based on the first blurring on a display unit, and displaying the second image obtained by moving a position of a cutout region of the second image and cutting out the second image in the position based on the second blurring on the display unit.

20. A non-transitory recording medium storing a program causing an imaging device to perform the imaging method according to claim 18.

* * * * *